(12) United States Patent
Jenett

(10) Patent No.: US 12,012,868 B2
(45) Date of Patent: Jun. 18, 2024

(54) DISCRETE MACROSCOPIC METAMATERIAL SYSTEMS

(71) Applicant: Massachusetts Institute of Technology, Cambridge, MA (US)

(72) Inventor: Benjamin Jenett, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 77 days.

(21) Appl. No.: 17/654,889

(22) Filed: Mar. 15, 2022

(65) Prior Publication Data

US 2022/0290570 A1 Sep. 15, 2022

Related U.S. Application Data

(60) Provisional application No. 63/161,251, filed on Mar. 15, 2021.

(51) Int. Cl.
  *B32B 3/06* (2006.01)
  *E04B 1/19* (2006.01)
  *E04B 1/344* (2006.01)
  *E04C 1/00* (2006.01)
  *F01D 5/14* (2006.01)
  *F01D 5/28* (2006.01)

(52) U.S. Cl.
  CPC ............... *F01D 5/286* (2013.01); *E04B 1/19* (2013.01); *E04B 1/344* (2013.01); *E04B 1/3441* (2013.01); *F01D 5/147* (2013.01)

(58) Field of Classification Search
  CPC . E04B 1/19; E04B 1/344; E04B 1/341; F04D 5/147; F04D 5/286; B32B 3/06

USPC ......................................... 52/646; 428/98, 99
See application file for complete search history.

(56) References Cited

U.S. PATENT DOCUMENTS

| | | | |
|---|---|---|---|
| 8,402,711 B2* | 3/2013 | Lusk | B25J 9/08 52/646 |
| 9,566,758 B2* | 2/2017 | Cheung | E04C 3/02 |
| 9,809,001 B2* | 11/2017 | Cheung | B64C 1/06 |
| 10,336,028 B1 | 7/2019 | Katz et al. | |
| 2006/0285758 A1* | 12/2006 | Marugame | G06T 9/001 382/236 |
| 2008/0187899 A1 | 8/2008 | Cabrera | |
| 2009/0030501 A1* | 1/2009 | Morris | A61F 2/92 623/1.15 |

(Continued)

OTHER PUBLICATIONS

International Search Report and Written Opinion; PCT/US22/20357; Mailed Aug. 15, 2022.

*Primary Examiner* — James J Buckle, Jr.
(74) *Attorney, Agent, or Firm* — Dunlap Bennett & Ludwig, PLLC

(57) ABSTRACT

A construction system for mechanical metamaterials based on discrete assembly of a finite set of modular, mass-produced parts. A modular construction scheme enables a range of mechanical metamaterial properties to be achieved, including rigid, compliant, auxetic and chiral, all of which are assembled with a consistent process across part types, thereby expanding the functionality and accessibility of this approach. The incremental nature of discrete assembly enables mechanical metamaterials to be produced efficiently and at low cost, beyond the scale of the 3D printer. Additionally, a lattice structure constructed of two or more rigid, compliant, auxetic and chiral part types enable the creation of heterogenous macroscopic metamaterial structures.

6 Claims, 37 Drawing Sheets

(56) References Cited

U.S. PATENT DOCUMENTS

2012/0067529 A1  3/2012  Lusk
2018/0095448 A1  4/2018  Vernon

\* cited by examiner

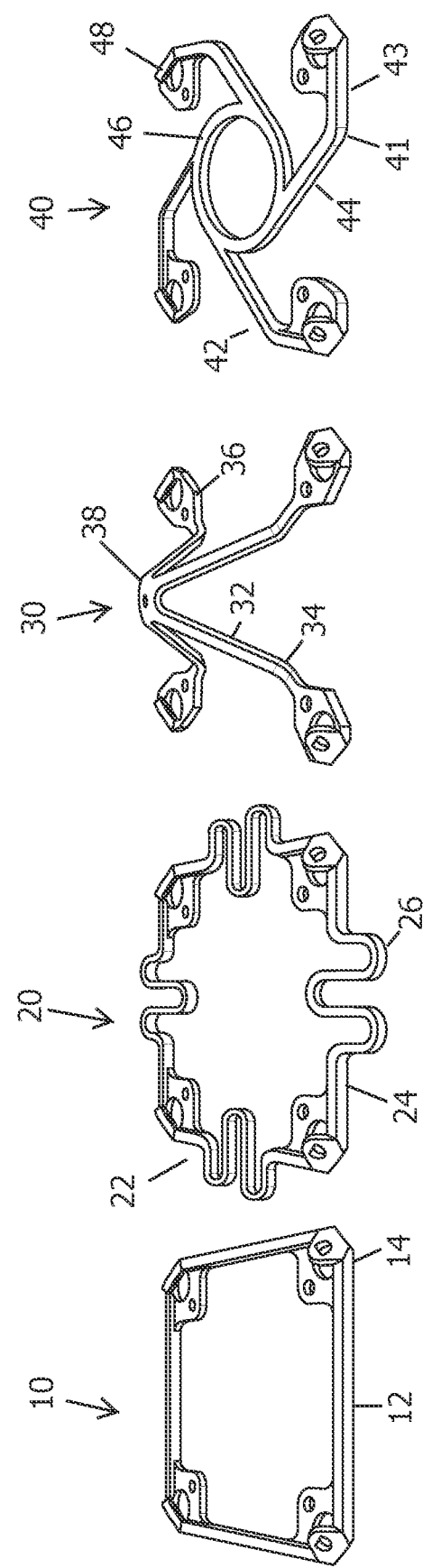

DISCRETE MACROSCOPIC METAMATERIAL SYSTEMS

CROSS-REFERENCE TO RELATED APPLICATION

This application claims the benefit of priority of U.S. provisional application No. 63/161,251, U.S. provisional application number filed 15 Mar. 2021, the contents of which are herein incorporated by reference.

BACKGROUND OF THE INVENTION

The present invention relates to light weight macroscopic structures and, more particularly, to macroscopic metamaterial systems and methods of assembly.

Engineering structures and systems today—from bridges to cars to airplanes—are informed and limited by the materials of which they are made, and the processes used to shape, join, and configure these materials into end products. Scale, cost, and performance are inevitably drivers for the types of structures that exist: the implication being large, high-performance structures are difficult and expensive to build. For instance, turbine blades are relatively cheap, but quickly run into issues at lengths over 50 m. Aircraft are more expensive and require dedicated infrastructure, such as airplanes bigger than airplanes to transport the airplanes. And finally, space structures like the ISS take decades to install and cost billions of dollars, yet ultimately are limited by the material and shaping processes used to make any other given structures on earth. Humans are highly skilled makers, but that does not change the fact that making big things is fraught with challenges.

The notion of rationally designing a material from the microscale to the macroscale has been a long-standing goal with broad engineering applications. From the field of material science, the notion first emerged of an artificial material with novel properties controlled by local, cellular design (e.g., electromagnetic metamaterials possess synthetic properties that allows them to interact with electromagnetic waves in ways that naturally occurring materials cannot). Benefits of nanoscale features to further expand the exotic property parameters on the microscopic level have also been explored.

In the field of mechanics, a practitioner is interested in controlling separately the elastic constants of an engineered material (modulus of elasticity E, bulk modulus K, shear modulus G, and Poisson's ratio v) to design macroscopic structures. And with the introduction of additive manufacturing, it was finally possible to materialize macroscopic mechanical metamaterials with superior stiffness and strength at ultralight densities with multiscale hierarchy.

However, additive manufacture has limits that undermine its use for large scale structures. Namely, the size of three-dimensional printer limits the size of the pieces that can be additively manufactured. In fact, for such larger construction projects, the cost, scalability, and throughput rates of alternative discrete assembly are competitive and, in some cases, better than state of the art additive manufacture, making discrete assembly of metamaterial lattice structures an appealing method for constructing large scale cellular structures.

As can be seen, there is a need for macroscopic metamaterial discrete lattice systems and methods of assembly that are scalable, versatile, and reliable.

The macroscopic metamaterial systems embodied in the present invention exhibit a new range of attainable properties, such as rigidity, compliance, chirality, and auxetic behavior, all within a consistent manufacturing and assembly framework. These discrete mechanical metamaterials show global continuum properties based on local cellular architectures, resulting in a system with scalability, versatility, and reliability.

Furthermore, the macroscopic metamaterial discrete lattice systems of the present invention enable assembly automation through use of mobile robots adapted to operate relative to their discrete material environment. By leveraging the embedded metrology of discrete materials, these relative robots have reduced complexity without sacrificing extensibility, enabling the robots to build structures larger and more precise than themselves. Additionally, multi-robot assembly has cost and throughput benefit at larger scales.

The present invention contemplates discretely assembled systems utilizing internal architectures at the macroscopic unit cell level, that can be designed to transmit or respond to load in non-standard ways. For example, auxetic metamaterials exhibit zero or negative Poisson's ratio, wherein internal, re-entrant architectures produce contraction perpendicular to compressive loading, and expansion perpendicular to tensile loading, counter to traditional continuum material behavior. Chiral metamaterials exhibit handedness based on asymmetric unit cell geometry. These designs produce out of plane deformations, such as twist, in response to in plane loading.

The unit cell level, called voxel herein, are composed of vertex-connected open face parts to form the cuboctahedra voxel. Each of these face parts have a unique structure and geometry that lend themselves to the metamaterial properties on the unit cell level and when assembled in a lattice structure.

Additionally, the present invention contemplates discretely assembled heterogeneous systems that combine different voxel types, wherein metamaterial performance is projected to larger scales, such as turbine blades for large scale wind energy capture. In sum, these discrete systems demonstrate new, disruptive capabilities not possible within the limits of traditional manufacturing.

SUMMARY OF THE INVENTION

In one aspect of the present invention, a cell face for a cuboctahedron cell voxel of a discrete macroscopic lattice structure, the cell face having four beams joined together in a square shape, each beam having a beam portion with a thickness; and at least one beam having a spring-beam portion with a spring-beam geometric parameter.

In another aspect of the present invention, a cell face for a cuboctahedron cell voxel of a discrete macroscopic lattice structure includes wherein the beam portion resolves an external load substantially through axial bending, wherein the spring-beam portion resolves the external load substantially through axial deformation as a function of the spring-beam geometric parameter, wherein each spring-beam portion is defined by a geometric parameter having an amplitude greater than the thickness, wherein the geometric parameter defines a corrugated shape, wherein the geometric parameter defines a waveform having the amplitude, and wherein the at least one beam is less than four beams.

In yet another aspect of the present invention, a method of producing the discrete macroscopic lattice structure of claim 1, the method includes choosing a lattice pitch for the discrete macroscopic lattice structure; assembling a sufficient number of cell faces into a plurality of cuboctahedron cell voxels, wherein each beam of each cell face has a spring-beam portion, wherein each cell face is defined by the lattice pitch; and face attaching a sufficient number of the cuboctahedron cell voxels into the discrete macroscopic lattice structure.

Also contemplated by the present invention, is a method of producing a heterogenous lattice structure from the above discrete macroscopic lattice structure, wherein the method further includes manufacturing a plurality of rigid cuboctahedron cell faces, wherein each rigid cuboctahedron cell face having the following: the lattice pitch; and four rigid beams joined together by their respective ends to form a square shape, wherein each rigid beam is linear between their ends; assembling a sufficient number of rigid cuboctahedron cell faces into at least one rigid cuboctahedron cell voxel; and face attaching the at least one rigid cuboctahedron cell voxel to said discrete macroscopic lattice structure.

In another aspect of the present invention, a cell face for a cuboctahedron cell voxel of a discrete macroscopic lattice system includes a plurality of intersecting planes of reentrant mechanisms, wherein each reentrant mechanism resolves uniaxial tension and compression with a lateral expansion and contraction, respectively, wherein the lateral expansion and contraction is a function of an auxetic parameter, wherein the auxetic parameter is a reentrant distance, and wherein a plurality of the cell faces arranged into the cuboctahedron cell voxel, wherein the cuboctahedron cell voxel exhibits a near-zero Poisson's ratio, wherein said cell voxel responds to axial strain with a similarly signed transverse strain, and wherein the plurality of intersecting planes of reentrant mechanisms includes four coplanar nodes, wherein each node is coupled to a distal end of a reentrant mechanism, and wherein a proximal end of each reentrant mechanisms joins at a connection point out of plane with the four coplanar nodes.

In yet another aspect of the present invention, a cell face for a cuboctahedron cell voxel of a discrete macroscopic lattice system, wherein the cell face includes a chirality orientation defined by a macroscopic twisting in either a clockwise (CW) or a counterclockwise (CCW) direction in a direction normal to a direction of loading; a beam tangentially extending from each of four equally spaced apart points along an arcuate hub; and each beam having a linear body portion and a terminal node, wherein a center of the terminal node is in linear alignment with a center of the arcuate hub, wherein for each beam the linear body portion is disposed clockwise (CW) relative to the terminal node, wherein for each beam the linear body portion is disposed counterclockwise (CCW) relative to the terminal node, wherein a cell voxel comprising a plurality of the cell faces is directionally anisotropic.

The present invention also contemplates a turbine blade comprising a plurality of cuboctahedron cell voxels, wherein the plurality of cuboctahedron cell voxels is arranged in a lattice structure, wherein the turbine blade comprises a base and a tip, and wherein the plurality of cuboctahedron cell voxels is arranged in decreasing effective density from the base to the tip, wherein each cell voxel includes: a plurality of cuboctahedron cell faces, wherein each cuboctahedron cell face comprises: a lattice pitch; and four beams joined together to form a square shape, each beam having a thickness, wherein said effective density is a function the thickness, wherein a gradient of decrease of effective density occurs at discrete intervals, wherein the turbine blade comprises a base and a tip, wherein the plurality of cuboctahedron cell voxels includes bending-dominated cell voxels and stretch-dominated cell voxels, and wherein the plurality of cuboctahedron cell voxels transitions from the stretch-dominated cell voxels to the bending dominated cells voxels from the base to the tip.

These and other features, aspects and advantages of the present invention will become better understood with reference to the following drawings, description and claims.

BRIEF DESCRIPTION OF THE DRAWINGS

FIGS. 2A-2E show the rigid, compliant, auxetic and chiral types (L to R) for face-connected cuboctahedron of (A) face parts, (B) single voxel, front view, (C) 2×2×2 cube, front view, (D) Single voxel, oblique view, and (E) A 2×2×2 oblique view.

DETAILED DESCRIPTION OF THE INVENTION

Figure 1A:
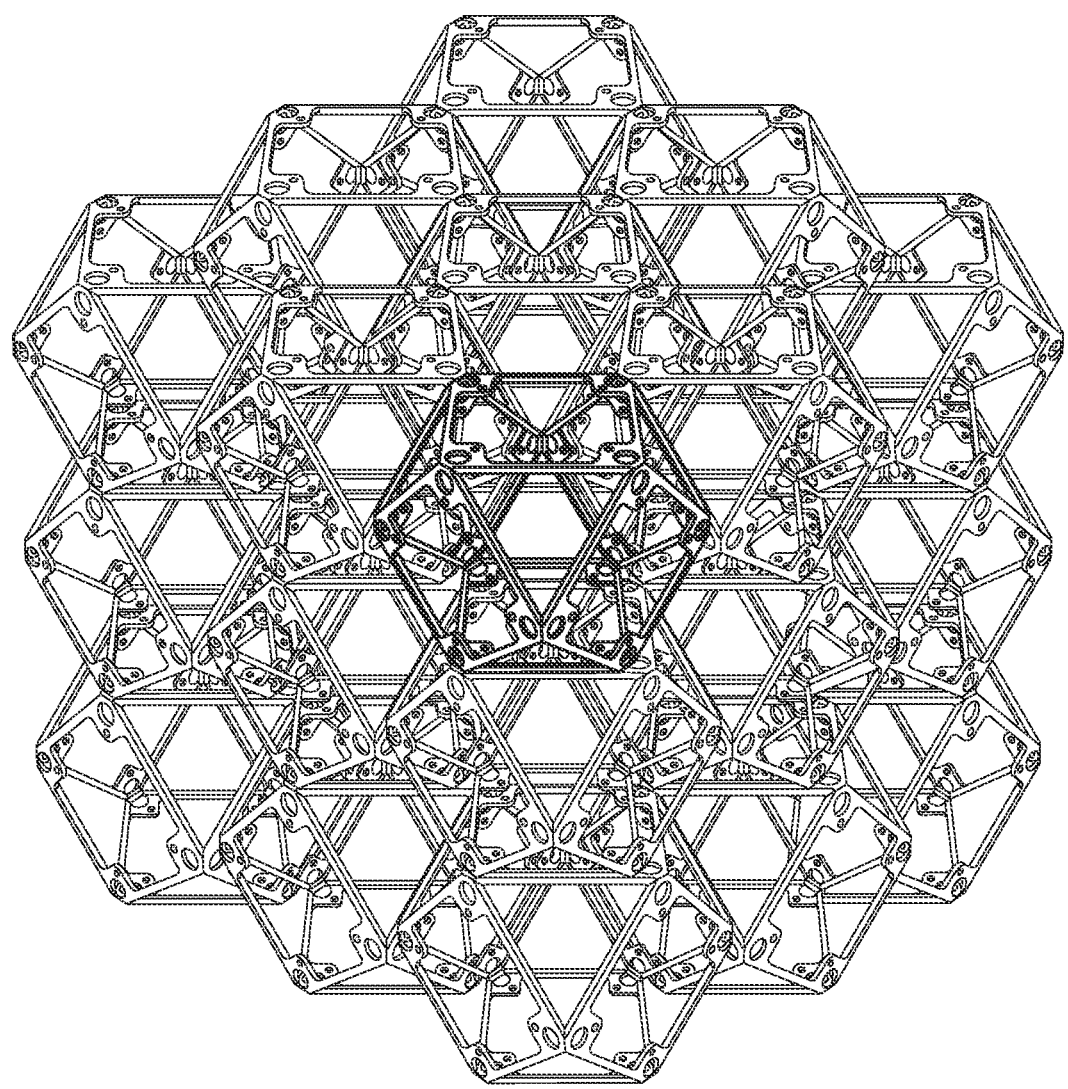
FIGS. 1A-1C shows steps in decomposition of a face-connectable cuboctahedron voxel lattice.
Figure 1B:
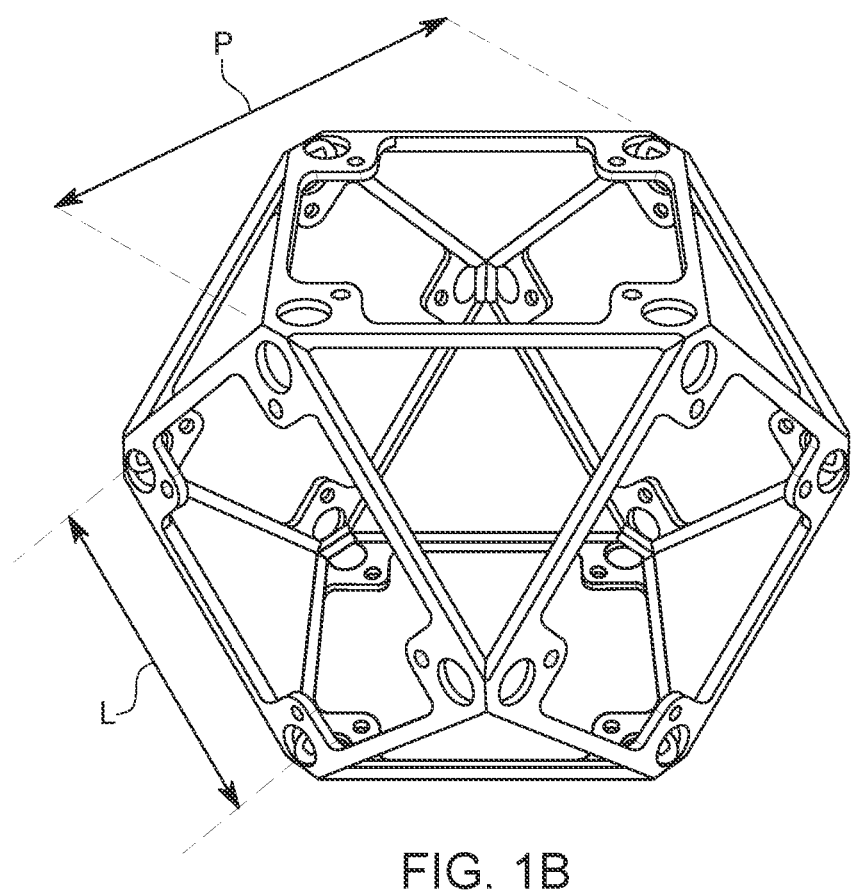
Figure 1C:
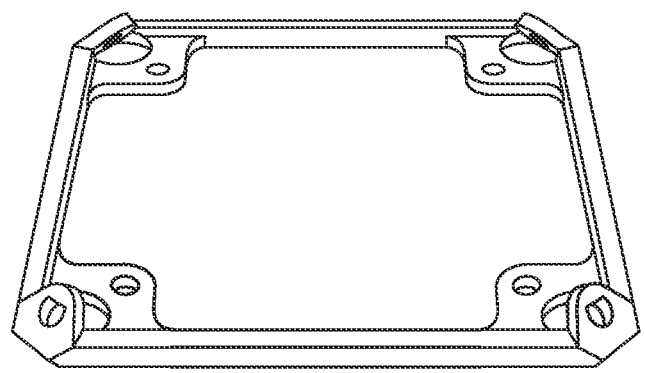
Figure 2B:
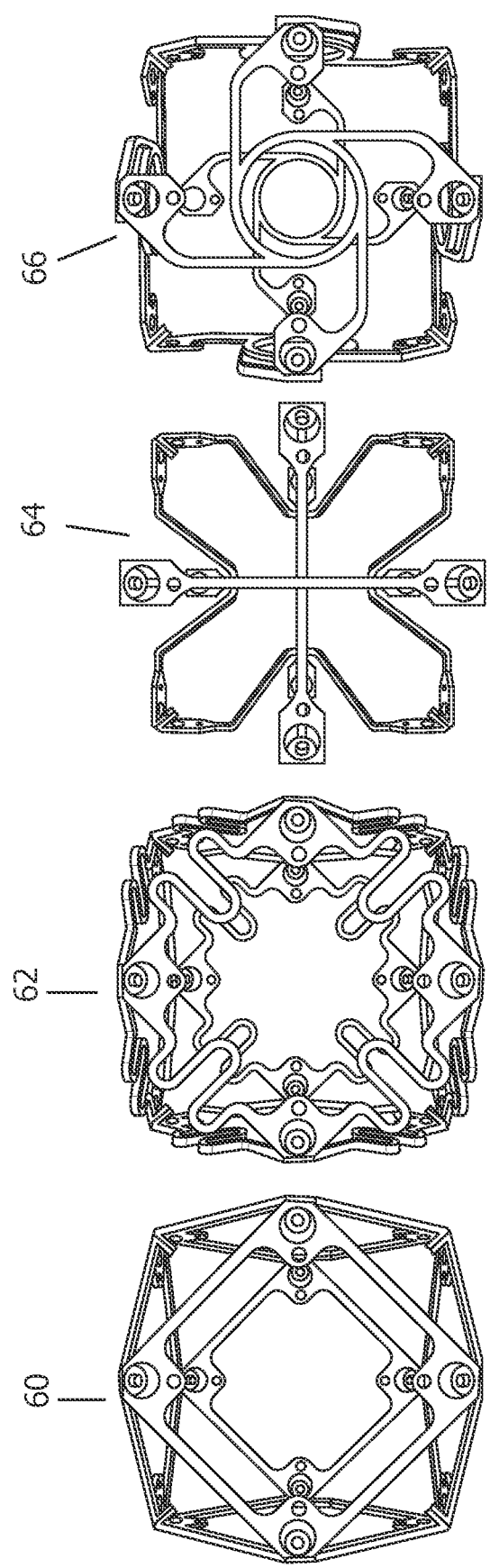
Figure 2C:
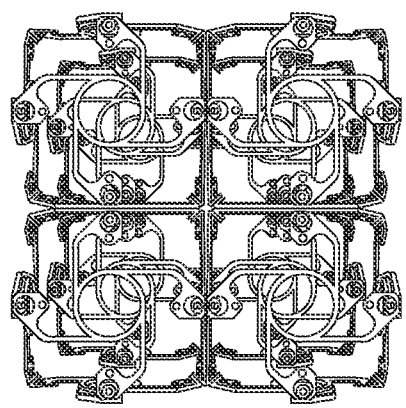
Figure 2C:
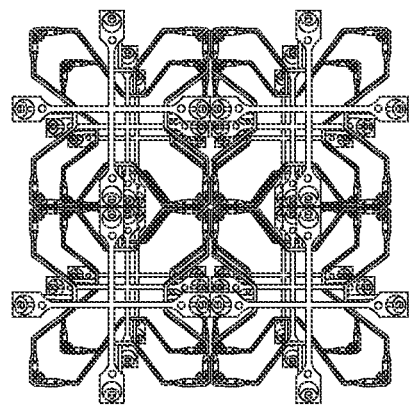
Figure 2C:
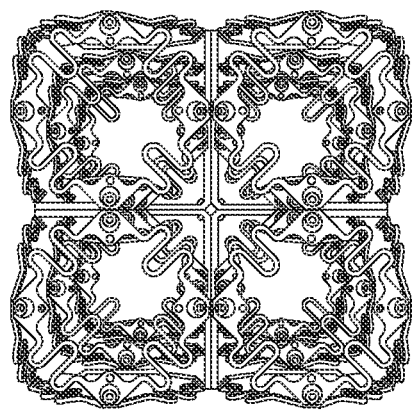
Figure 2C:
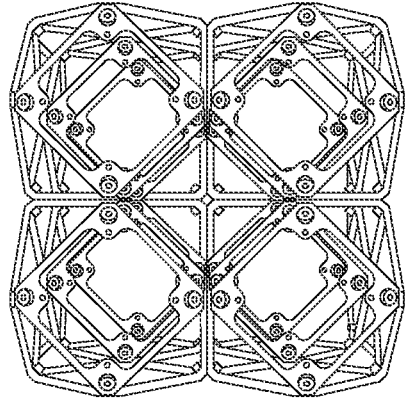
Figure 2D:
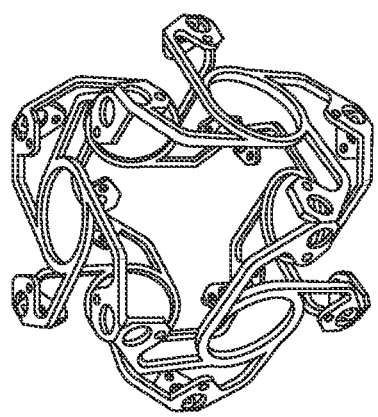
Figure 2D:
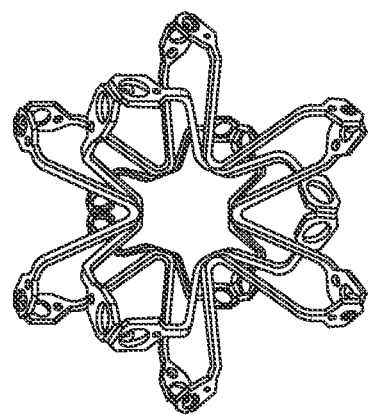
Figure 2D:
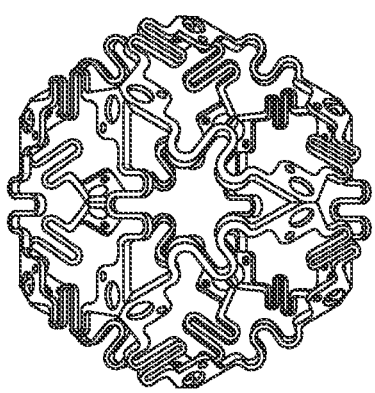
Figure 2D:
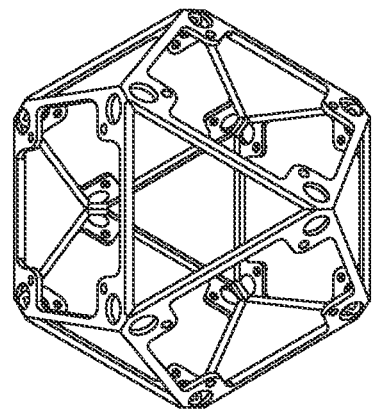
Figure 2E:
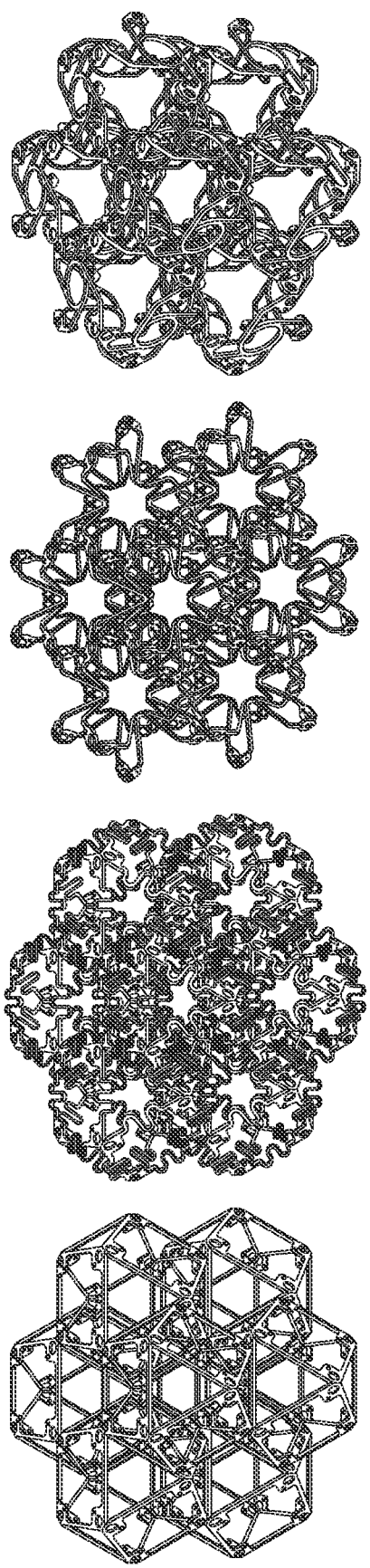

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a construction system for mechanical metamaterials based on discrete assembly of a finite set of modular, mass-produced parts. A modular construction scheme enables a range of mechanical metamaterial properties to be achieved, including rigid, compliant, auxetic and chiral, all of which are assembled with a consistent process across part types, thereby expanding the functionality and accessibility of this approach. The incremental nature of discrete assembly enables mechanical metamaterials to be produced efficiently and at low cost, beyond the scale of the 3D printer. Additionally, a lattice structure constructed of two or more rigid, compliant, auxetic and chiral part types enable the creation of heterogenous macroscopic metamaterial structures.

Referring now to FIGS. 1 through 12 the present invention may include cuboctahedra lattice systems decomposable into face connected cuboctahedra voxels, which are simple to repeatably manufacture, and have a straightforward path to assembly.

For proper lattice behavior, the assembled structure should act as a network of beams. Specifically, both the macroscopic stiffness and strength criteria should be governed by local beam properties, and not by the joints. To ensure this, the joints have higher stiffness and strength values than the beams, that way, from a structural point of view, the joints disappear, and the designer is left with the network of beams that the designer wanted originally, as if they were made monolithically.

A lattice, or a mechanical metamaterial having a periodic network of interconnected beams, can be described, and its performance predicted, analytically as stretch- or bending-dominated, based on how they resolve external forces as a function of their internal beam connectivity, which corresponds to Maxwell's frame rigidity criteria. Stretch-dominated lattices, such as the octet, have higher connectivity (Z=12) and higher stiffness to weight than bending-dominated lattices, such as the kelvin, which have lower connectivity (Z=4).

The present invention embodies the cuboctahedra lattice geometry, which is uniquely positioned between low and high connectivity (Z=8) yet has been shown to have stretch-dominated behavior, in both micro lattice implementation and as discretely assembled vertex connected octahedra.

Additionally, the decomposition using face-connected cuboctahedra voxels which produces the same lattice geometry but has additional benefits to be discussed herein. Voxels are discretized into faces, which include beams and joints. There are two types of joints: inner-voxel joints are the points at which six separate faces are joined to form a voxel, and inter-voxel joints provide the vertex-to-vertex connections between neighboring voxels at along a single face. A joint may include nodes, which are the geometric features on the part providing the fastening area, and the fasteners, which are mechanical connectors. Based on the material and geometric properties of each subsystem, local properties can be controlled to ensure proper global, continuum behavior.

In a basic, rigid case, the lattice may behave as an interconnected network of beams, and so the joint design possesses significantly higher effective stiffness and strength than the beams they connect. In this way, the global effective stiffness and strength of the lattice are governed by those subsystems with the lowest relative value. A rigid cuboctahedra voxel is taken as the "base" unit, which is used for describing system architecture such as critical dimensions and relative structural performance metrics.

Due to the construction employed, in-plane face loads are transferred through adjacent nodes to the outward face, which is normal to the load path direction. At the junction of four, in-plane voxels, there may be three possible load paths: all compression, all tension, or mixed tension and compression. All compression is resolved through contact pressure of the node area, which helps in reducing the resulting pressure magnitude. All tension loads may transfer from in plane beams, through inner-voxel joints, then through rivets which are parallel to the load path but fixtured to faces which are normal to the load path. Combined loads have overlapping, orthogonal load paths. Having determined the unique load paths that occur, a designer can determine stiffness and strength of each of the subsystems, from the fasteners to the joints, to the beams, and ultimately, to proper continuum lattice behavior.

Fasteners to interconnect the voxel faces may include nuts and bolts, flexural clips, rivets, and custom made androgynous interlocking parts. In some embodiments, face parts may be jointed at their corners with ³⁄₃₂" diameter aluminum blind pop rivets. They are assembled one at a time, to form a cuboctahedra voxel. Voxels are then joined to neighboring voxels at their face-connection locations, using the same fasteners.

Production of voxel faces include use of GFRP material through known processes of injection molding and the like, where the elastic modulus and yield strength vary based on the location of the gate and resulting knit lines. For injection molded FRP, fiber concentration reduces with distance from the gate.

Individual voxels have twelve joints, and a single voxel takes approximately 90-120 seconds to assemble. On average, once assembled a given voxel then has four rivets per face, which gives twenty-four rivets total, half of which are attributed to neighboring voxels. Thus, a single voxel has on average twelve face connections associated with its assembly time. Based on this and timed assembly exercises, the inventor estimates the average voxel assembly time to be 4.5 minutes.

Mechanical Metamaterial Part Types

Discretely assembled mechanical metamaterial system may include four (4) part types: rigid, compliant, auxetic, and chiral, shown in FIG. 2A-2E. Six face parts are assembled to form voxels which are then assembled to form multi-voxel lattices. The four lattice types and their behaviors will be described in further detail in the following subsections.

Rigid voxels resolve external loading through axial beam tension and compression, resulting in elastic, followed by plastic, buckling of struts. Lattice made with these parts shows near-linear density scaling of effective elastic modulus.

Compliant voxels are designed with corrugated flexure beams, a motif found in flexural motion systems, which resolve axial beam forces through elastic deformation of the planar flexures. Lattice made with these parts show consistent elastomeric behavior at even single voxel resolution and have a near-zero Poisson ratio.

Auxetic voxels are designed as intersecting planes of reentrant mechanisms, which expand and contract laterally under uniaxial tension and compression, respectively, producing an effective negative Poisson's ratio.

Chiral voxels are designed with an asymmetric mechanism which responds to in plane loading by producing either clockwise (CW) or counterclockwise (CCW) rotation. When interconnected in three dimensions, this produces out of plane twist in response to uniaxial tension or compression.

Rigid Lattice Behavior

Figure 3A:
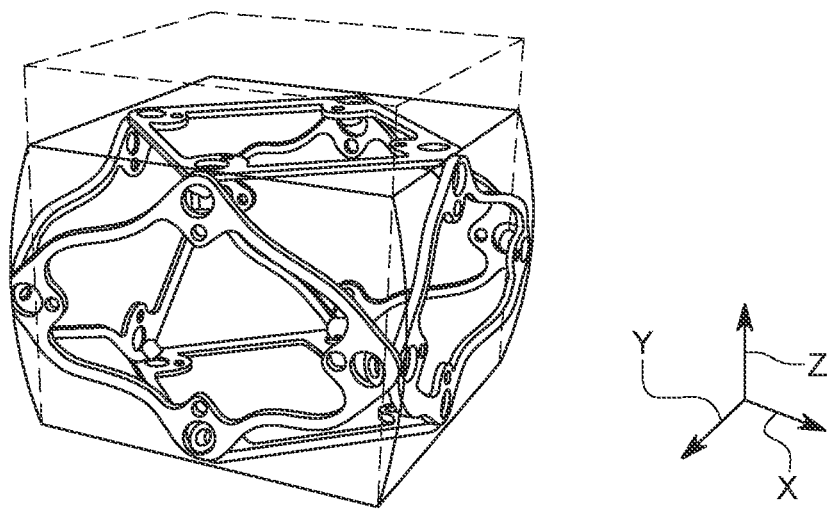
FIGS. 3A-3E show rigid mechanical metamaterial of (A) unit cell voxel demonstrating beam buckling and positive transverse strain in response to compressive load, (B) geometric parameters for simulations, where beam thickness t is a function of lattice pitch P, (C) Effective stiffness for reduced order beam model simulation and experimental results demonstrating asymptotic behavior approaching continuum value at increasing voxel count, (D) Reduced order beam model simulation results for rigid and compliant lattice of 10×10×10 cube. Observables are modulus-density scaling values being linear for rigid and near quadratic for compliant, and (E) free body diagram of unit cell illustrating how a rigid lattice type resolves external loads through axial member forces, in this case shown as compression and resulting member buckling.
Figure 3B:
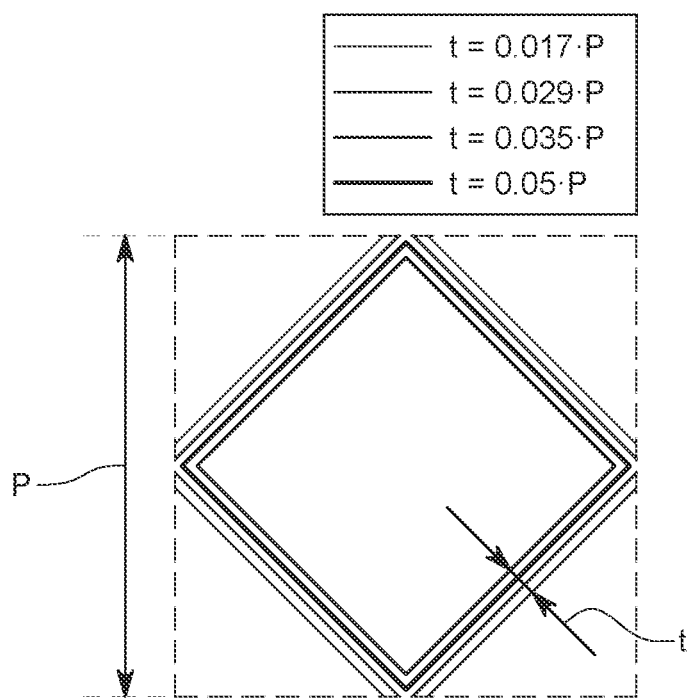
Figure 3C:
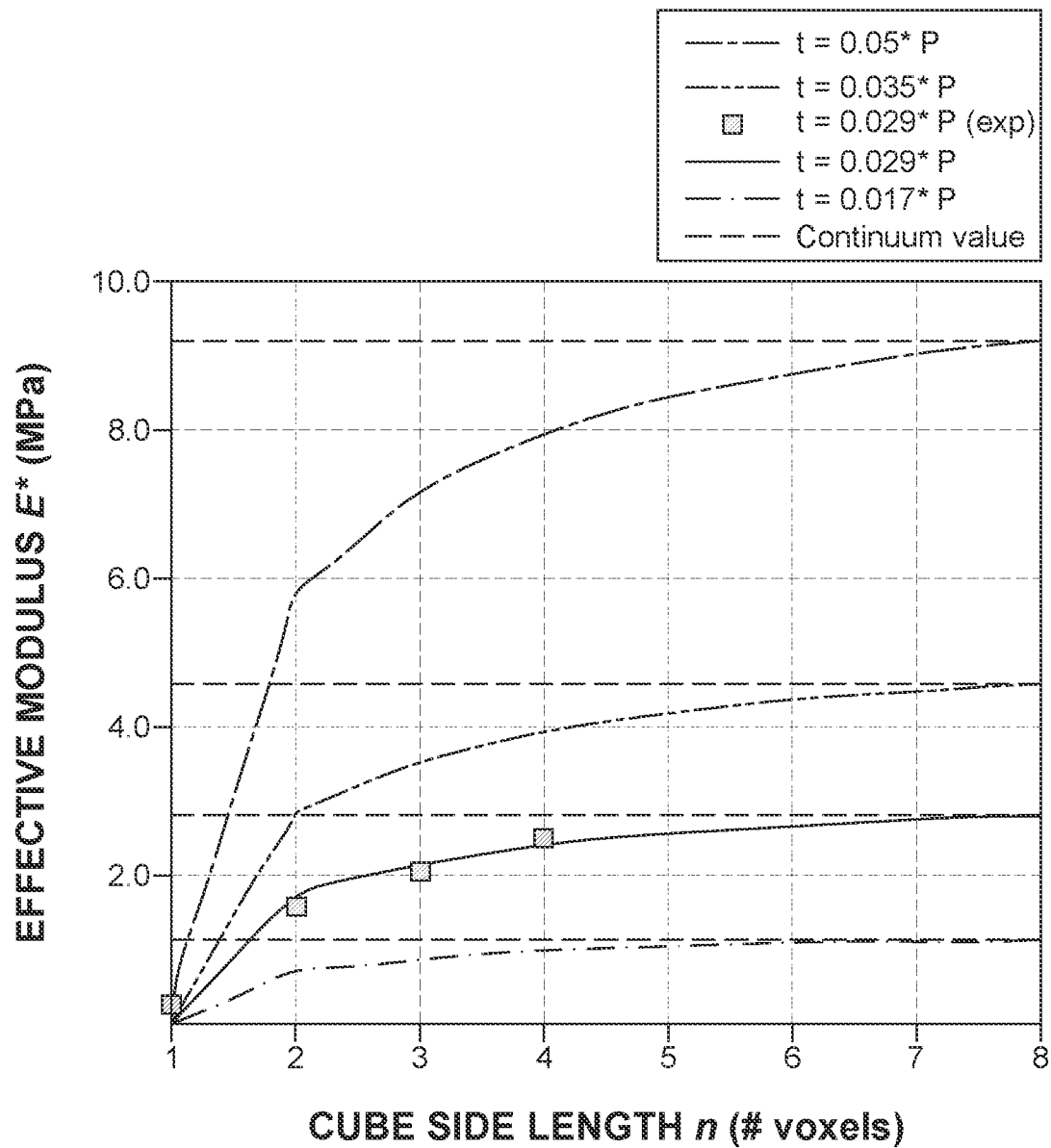
Figure 3D:
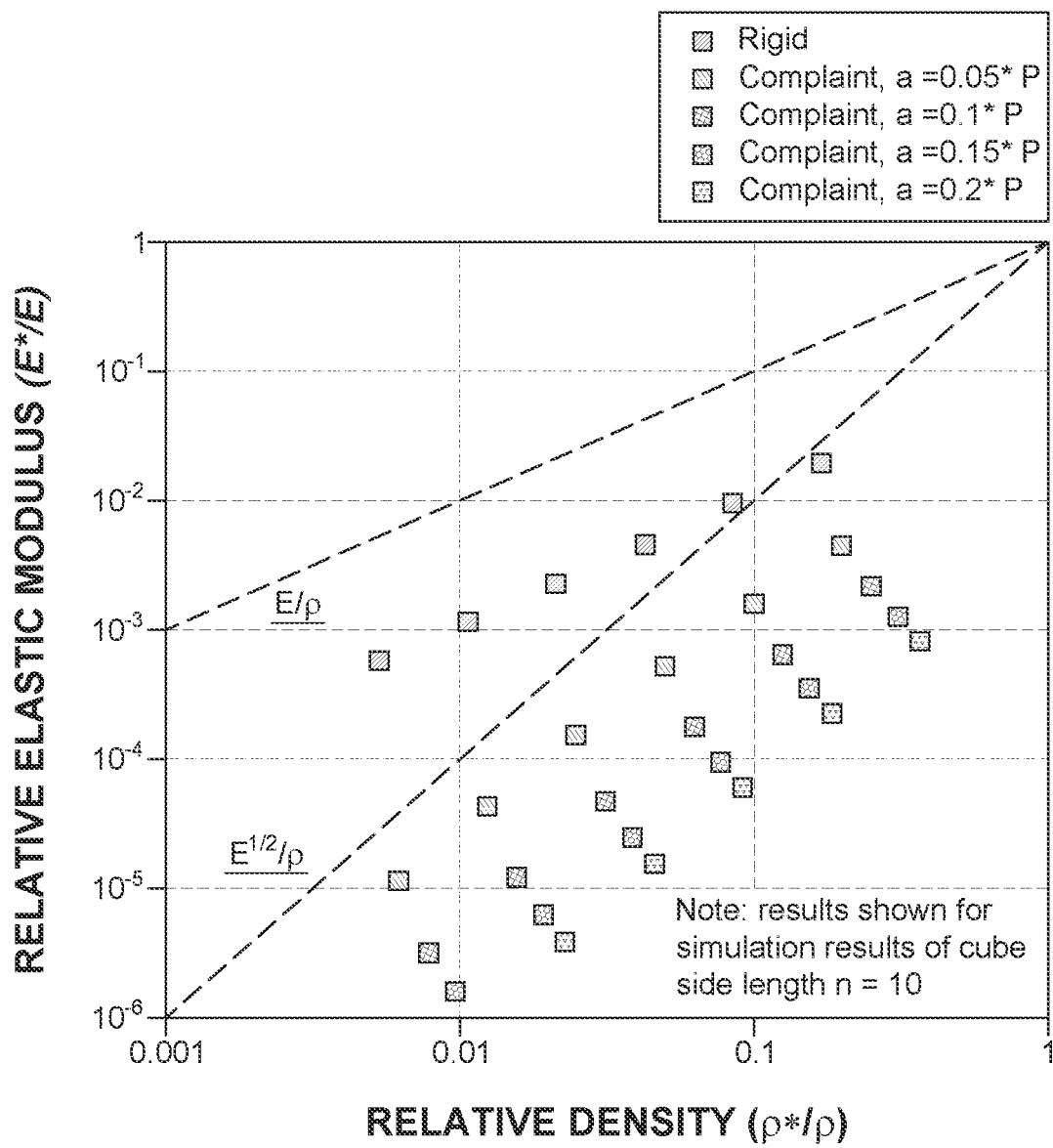
Figure 3E:
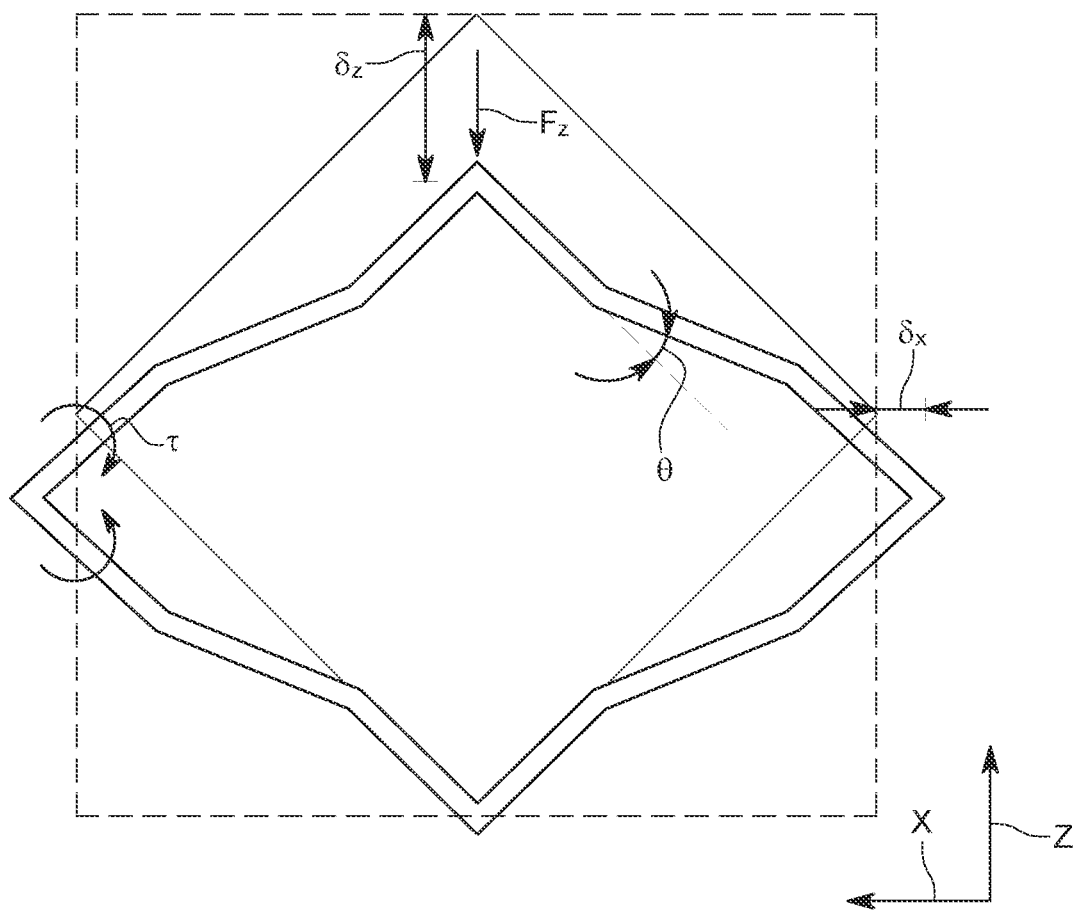

Referring to FIGS. 3A-3E, the rigid lattice type exhibits relative modulus-density scaling with geometric decomposition into discrete voxels 60 and face plates 10. The characteristic behavior of a unit cell voxel. The geometry is isotropic along its primary axes, and it responds to loads through axial beam tension and compression. While individual voxels are dominated by under constrained, mechanism behavior of the quadrilateral faces, when multiple voxels are joined, at nodes 14 or ends, there is sufficient connectivity to provide rigidity through triangulation of neighboring voxel faces. As a result, effective modulus increases with increasing cell count, and this value eventually reaches an effective continuum value, as seen in FIG. 3C.

Figure 8A:
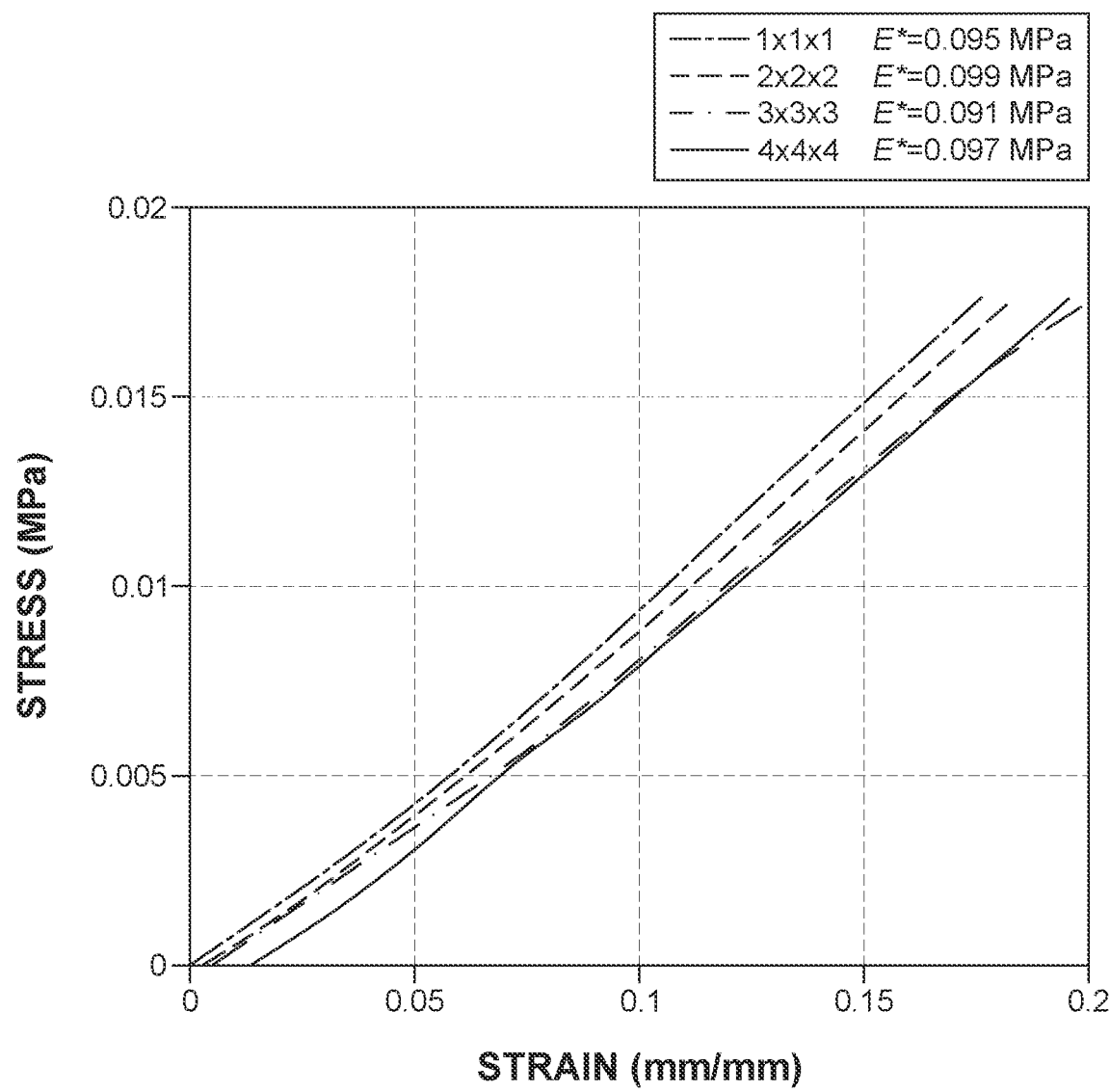
FIGS. 8A-8B show diagrammatical views of compliant lattice testing results of an exemplary embodiment of the present invention for (A) compression testing results, and (B) effective stiffness simulation and experimental results, which show near continuum value at low voxel count for all but the smallest spring-beam amplitude designs.

Having established that the global behavior is governed by the beam 12 properties, now, a designer can correlate analytical models with experimental results for effective lattice behavior. Regarding the effective elastic modulus E* and yield strength, the former corresponding to the linear portion of the stress strain curve under quasi-static loading, and the latter corresponding to the failure load divided by the specimen cross-section area. Stress-strain curves for lattice specimens of cube side voxel count n=1 to 4 are shown in FIG. 8A, where an initial linear elastic regime is followed by a nonlinear elastic regime and plastic yield. Using load and displacement data, stress and strain values are calculated based on lattice specimen size. The calculated moduli are shown with numerical results in FIG. 3C, in this case using the reduced order beam model it can be seen that as voxel count n increases, E* approaches a continuum value depending on the beam thickness, and thus relative density of the lattice.

Compliant Lattice Behavior

Figure 4A:
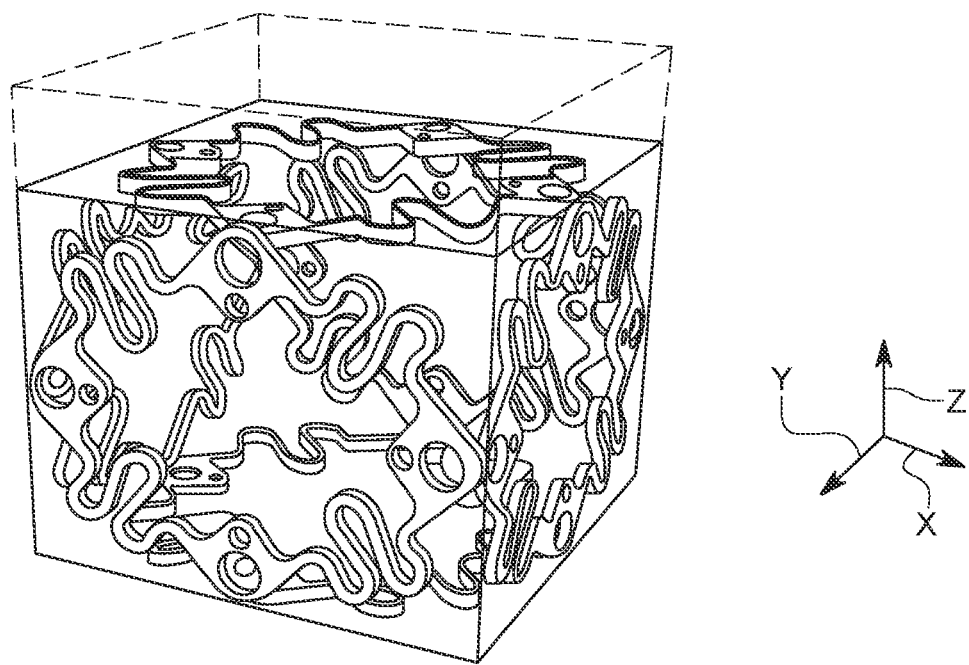
FIGS. 4A-4E show compliant mechanical metamaterial of (A) unit cell voxel demonstrating flexure spring-beam deformation and small transverse strain in response to compressive load, (B) geometric parameters for simulations, where spring-beam amplitude a is a function of lattice pitch P, (C) effective stiffness simulation and experimental results, which show near continuum value at low voxel count for all but the smallest spring-beam amplitude designs, (D) simulation results for effective Poisson's ratio for rigid and compliant lattice, with large spring-beam amplitudes having a value of near zero, and (E) free body diagram of unit cell illustrating how a compliant lattice type resolves external loads through axial shortening combined with a small amount of bending, producing little to no lateral reaction forces at nodes.
Figure 4B:
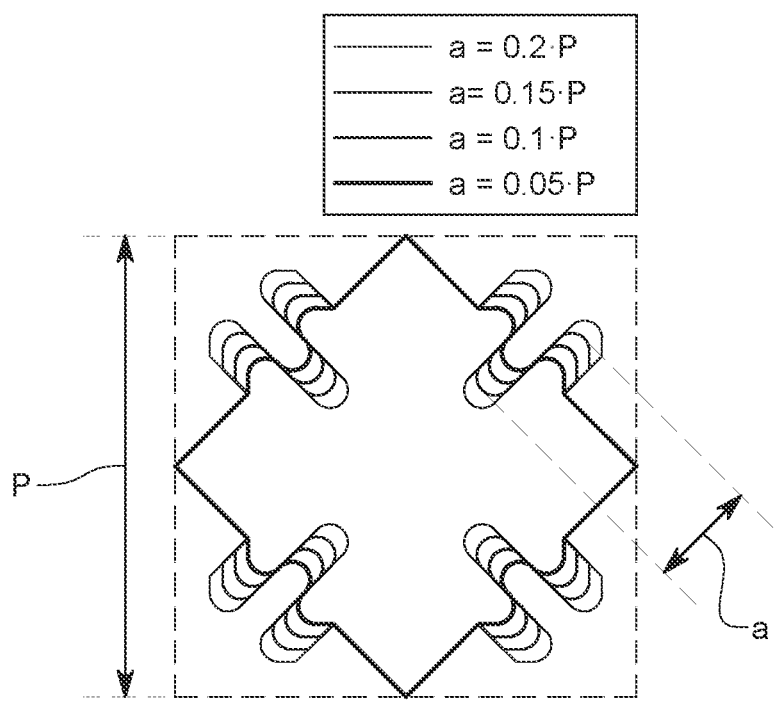

Referring to FIGS. 4A-4E, the compliant lattice type exhibits quadratic scaling for effective stiffness, as well as consistency across voxel counts regarding continuum behavior and elastic limit values. The characteristic behavior of a unit cell voxel 62 is shown in FIG. 4A. While the load paths are topologically the same as the rigid voxel, as this is a function of lattice connectivity, the mechanism through which beams resolve these loads is different. Here, the planar-spring beams deform in combined axial and in-plane bending, as a controllable property of the compliant features. This produces several unique behaviors in this lattice type. The compliant cell face 20 for a cuboctahedron cell voxel has four compliant beams 22 joined together in a square shape, each beam having a beam portion with a thickness; and at least one beam having a spring-beam portion with a spring-beam geometric parameter 26, wherein the compliant beams 22 may include a rigid beam portion 24/12 and the spring-beam geometric parameter 24. The spring-beam geometric parameter 24 may be described as a waveform, corrugated, or the like, with amplitude, a.

Figure 4C:
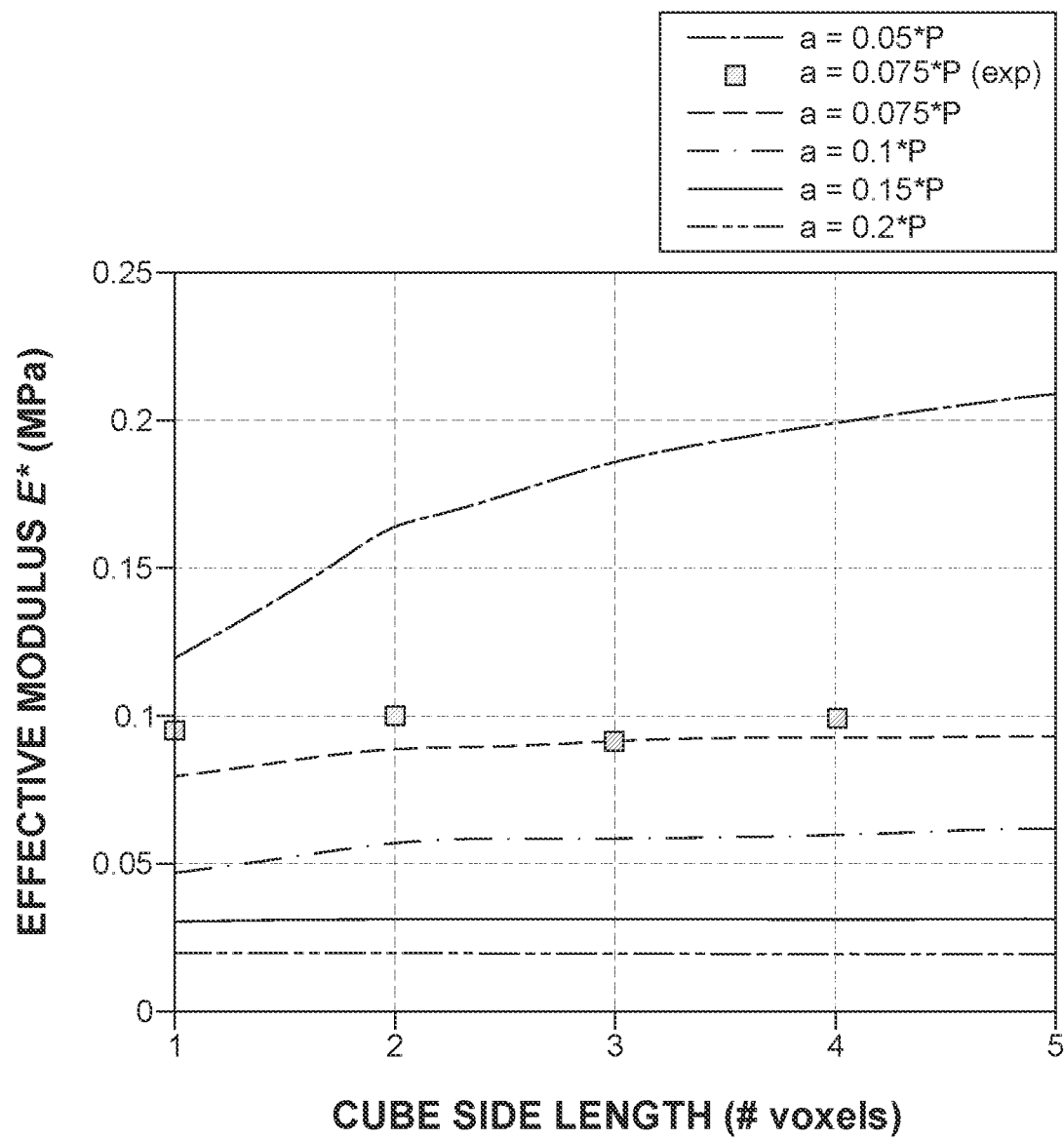
Figure 8B:
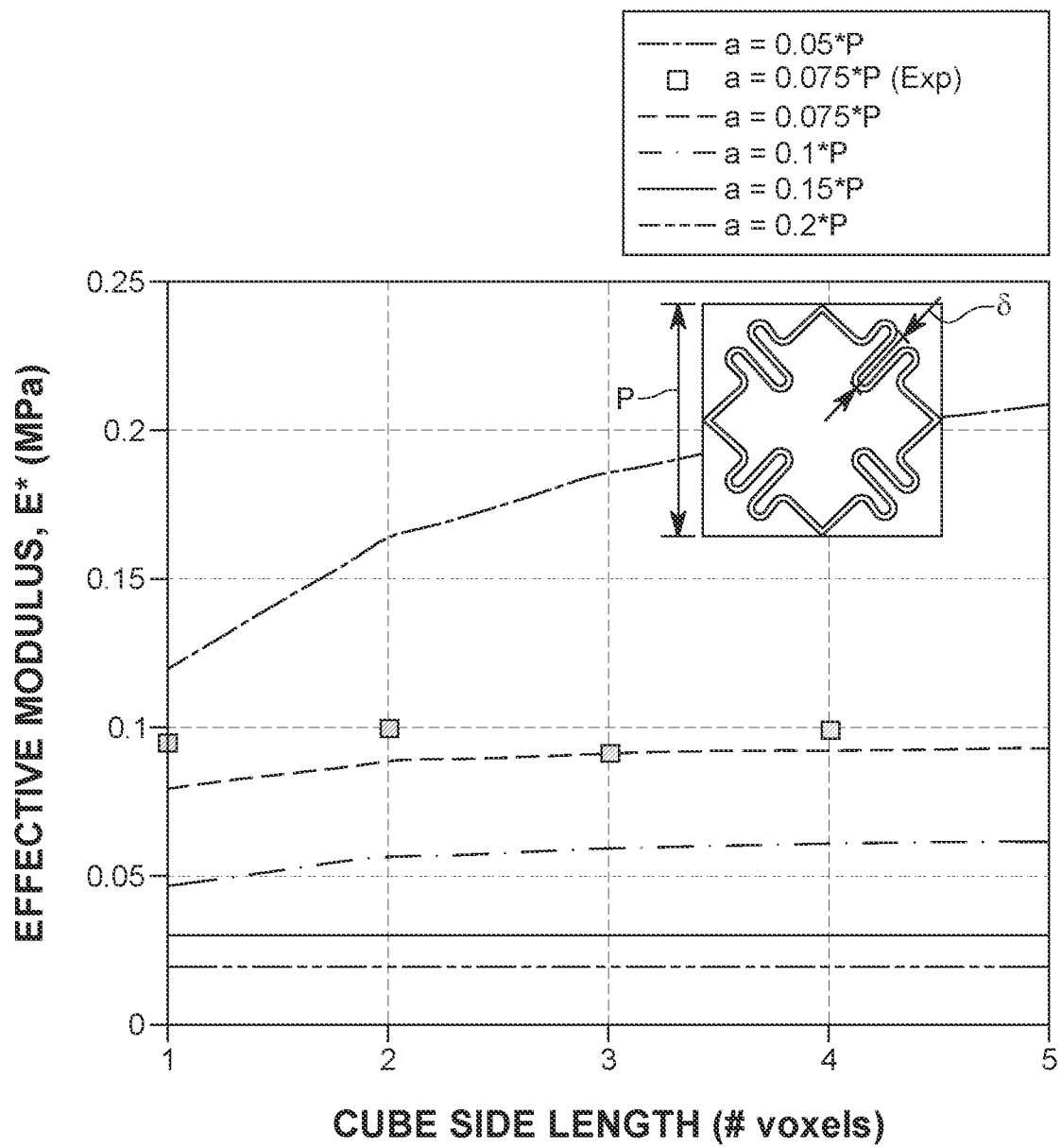
Figure 8C:
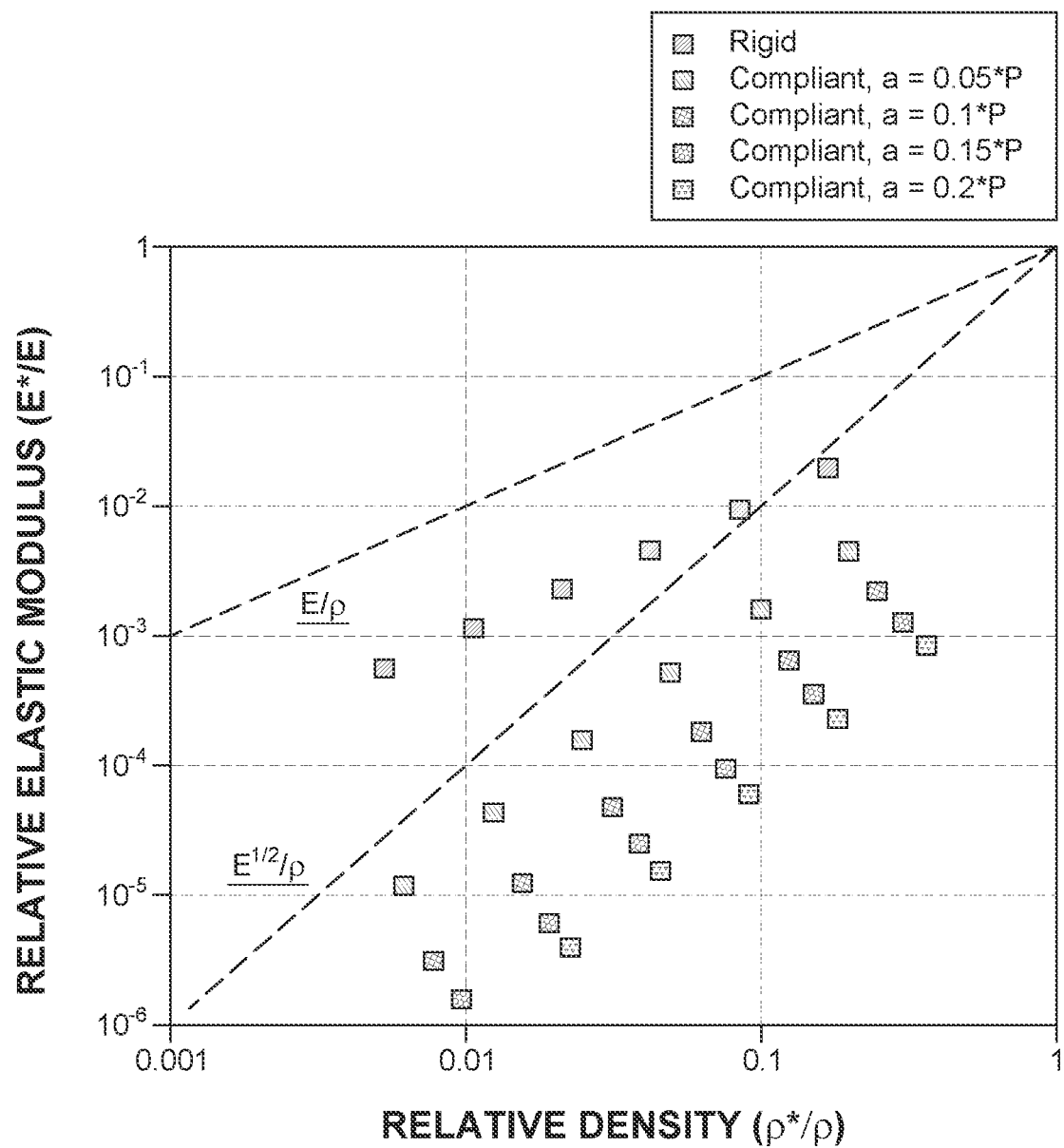
FIGS. 8C-8D show diagrammatical views of comparison of effective properties for rigid and compliant lattice of an exemplary embodiment of the present invention for (C) simulation results for modulus-density scaling value for rigid and compliant lattice, which are linear and quadratic, respectively, and (D) simulation results for effective Poisson's ratio for rigid and compliant lattice, with large spring-beam amplitudes having a value of near zero.
Figure 8D:
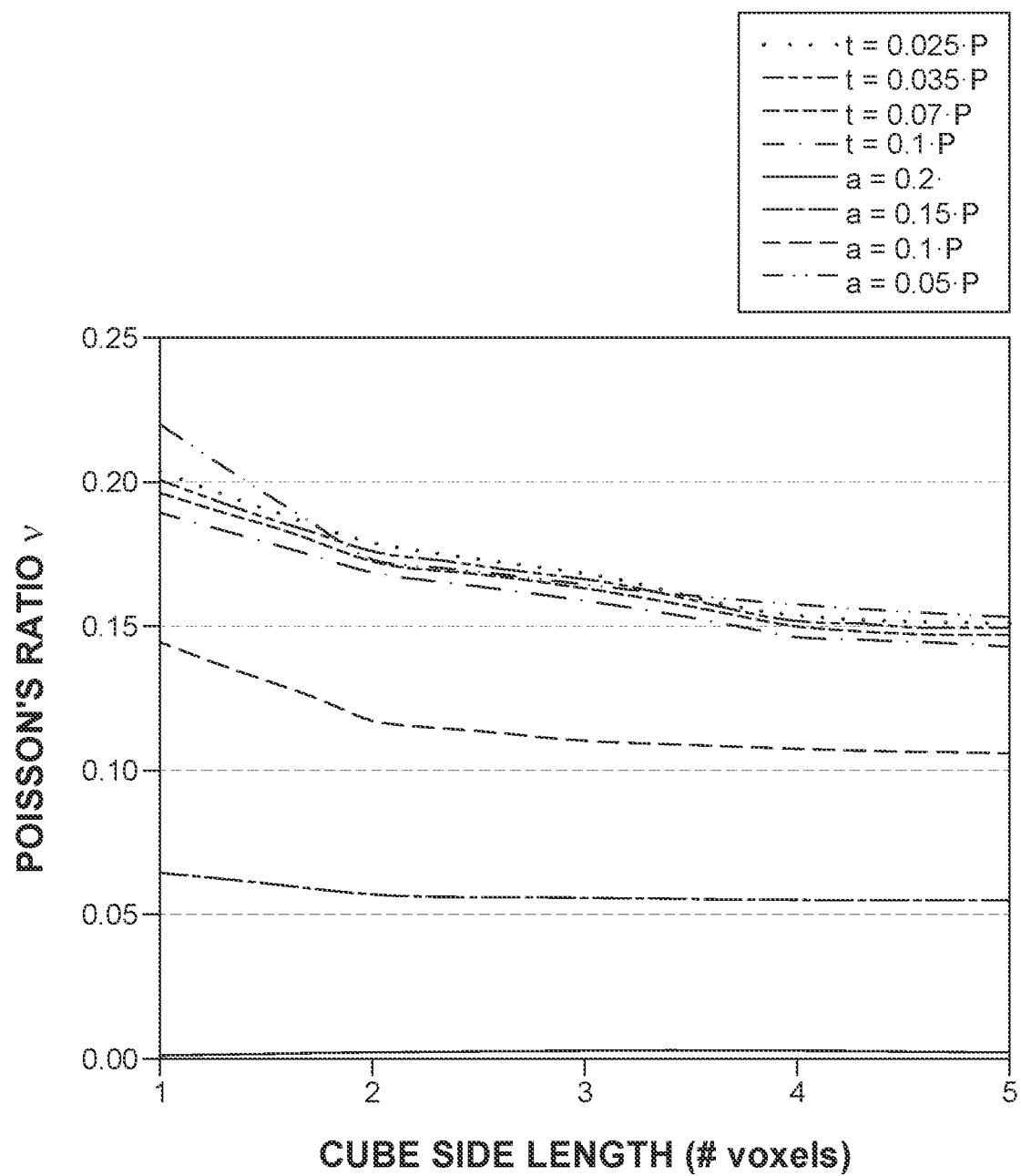
Figure 9A:
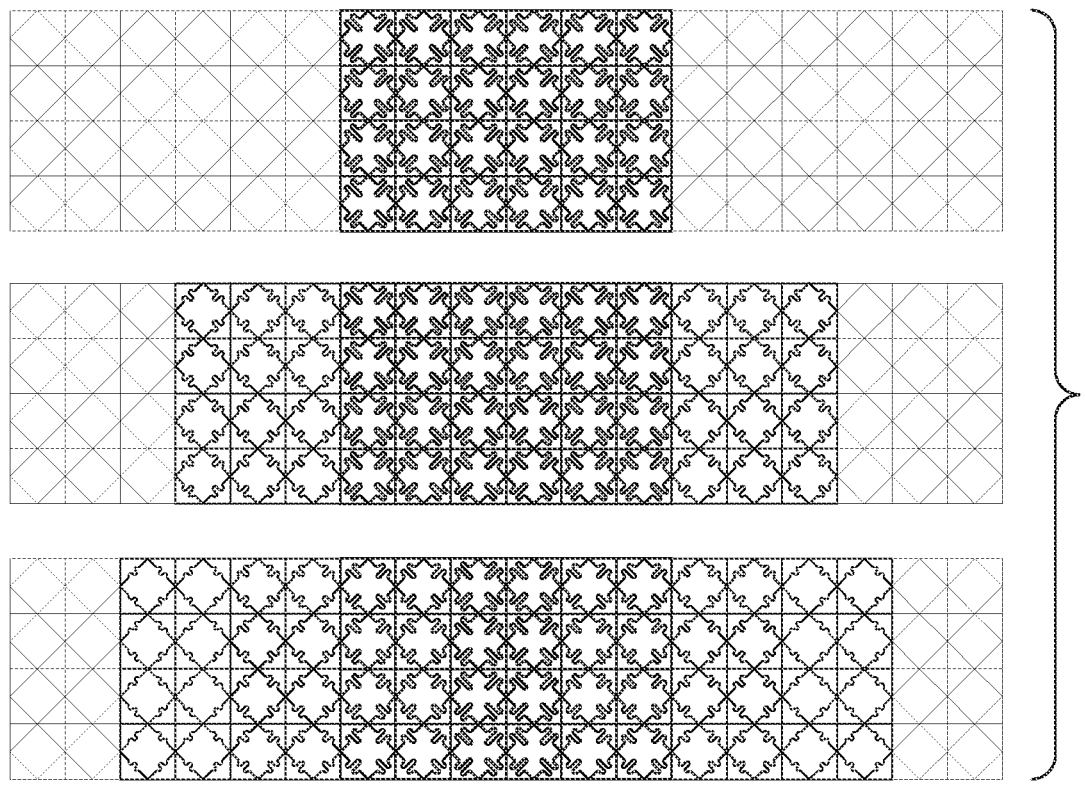
FIGS. 9A-9D show graded heterogeneous discrete lattices (A) compliant and rigid, with increasing gradation from top to bottom, (B) chiral to achiral by varying the diameter of the internal mechanism from D=P (lattice pitch) to D=0, (C) heterogeneous part types allow inner-face architectural control, and (D) representations of discrete cellular soft robots for walking, flying, and swimming.
Figure 9B:
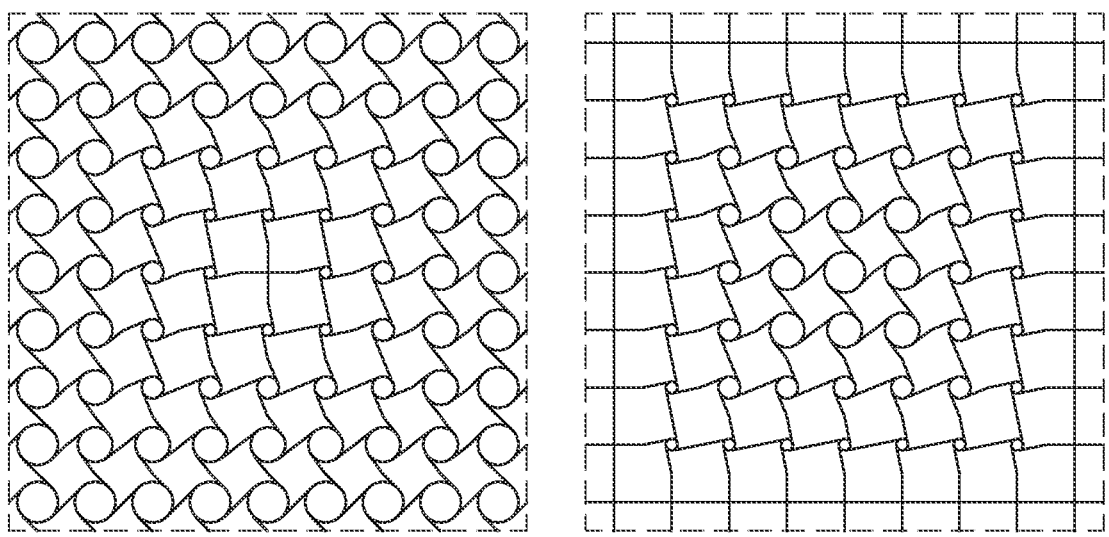
Figure 9C:
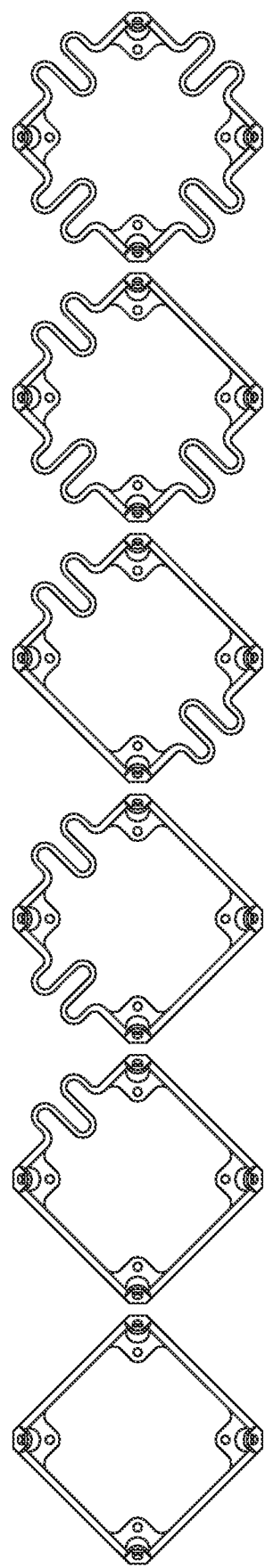
Figure 9D:
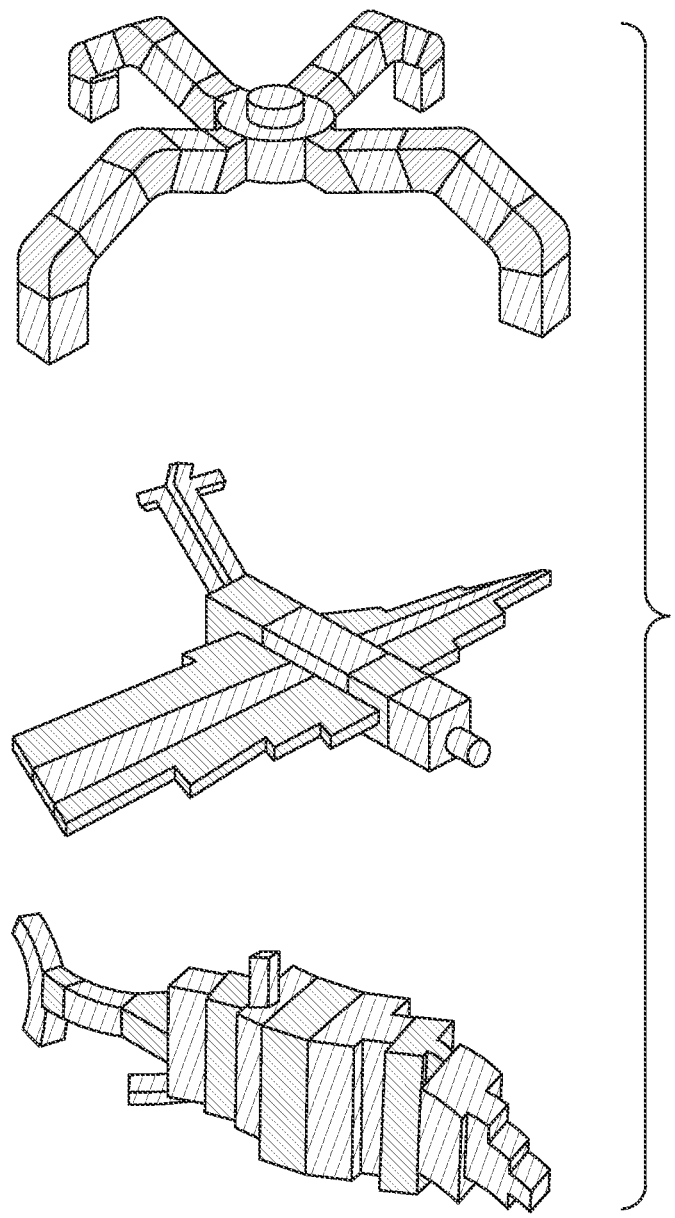
Figure 10:
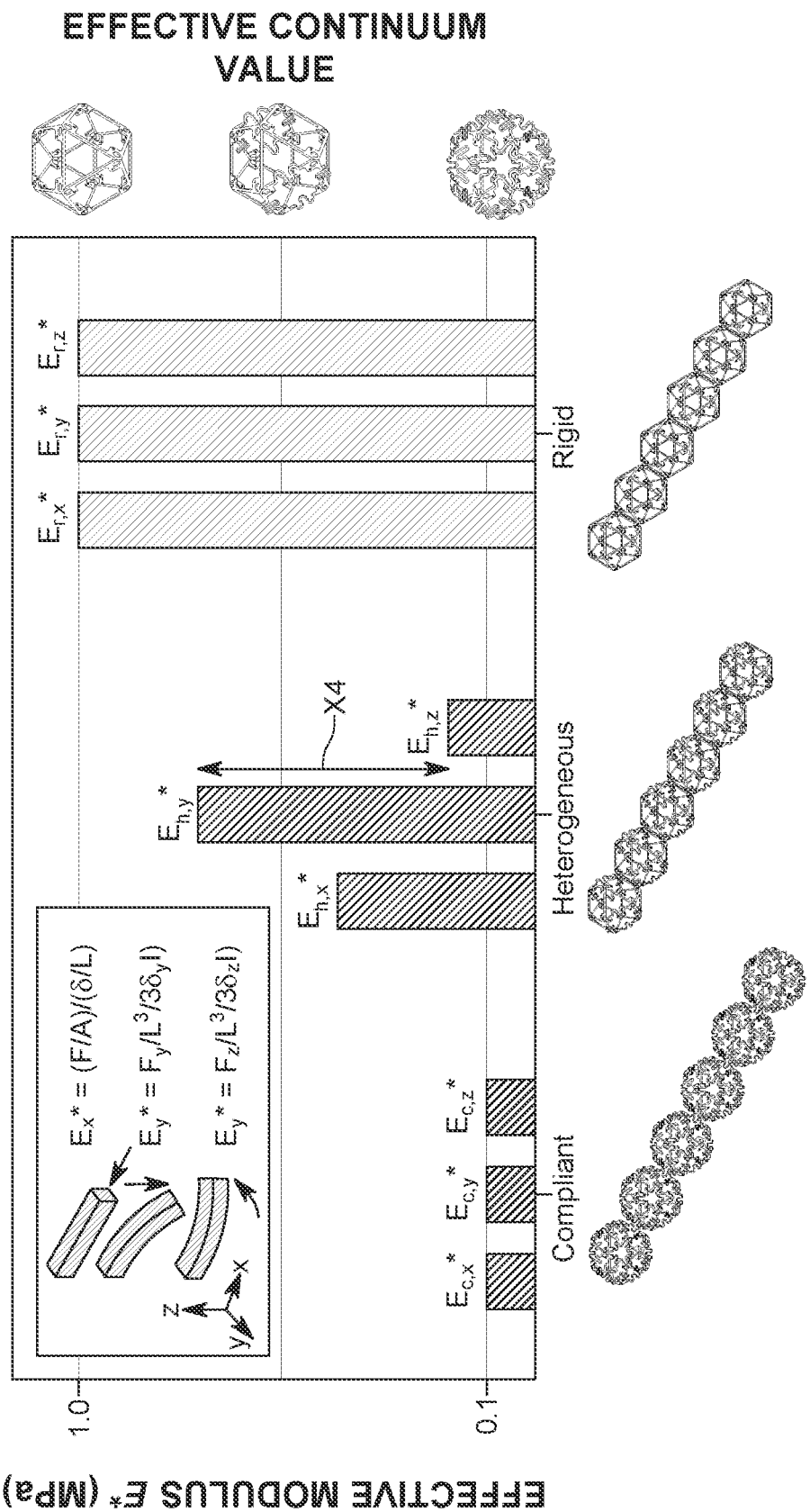
FIG. 10 is a diagrammatical view of an exemplary embodiment of the present invention illustrating a comparison of effective axial (x) and bending (y, z) modulus for compliant, heterogeneous, and rigid beams, measured experimentally on I-beams.

A designer can see from the experimental stress-strain curves that for similar strains, the compliant lattice shows linear elastic behavior up until the elastic limit (FIG. 8B). The stress at which this transition occurs is consistent across voxel counts, from n=1 to n=4. Second, the effective modulus is also consistent across voxel counts. This is confirmed by simulations using reduced order beam models, as shown in FIG. 4C. Given the large range of linear to nonlinear and individual to continuum behavior seen in the rigid lattice, the compliant lattice is markedly different in its consistency. This behavior is attributable to the spring-like behavior of the beams, a similar observation to analytical models for stochastic foams. As cube specimen side length voxel count increases, so do the number of springs acting in parallel, which produces an effective spring stiffness $K_{eff}=K_1+K_2+K_n\ldots$. However, as spring count increases, so does effective area, both proportional to side length squared. Thus, a single voxel has the same effective modulus as a 4×4×4 cube or an n×n×n cube. This effect is reduced as beam-spring amplitude (a) goes to zero, meaning it shows more asymptotic behavior similar to the rigid cuboctahedra lattice.

Figure 4D:
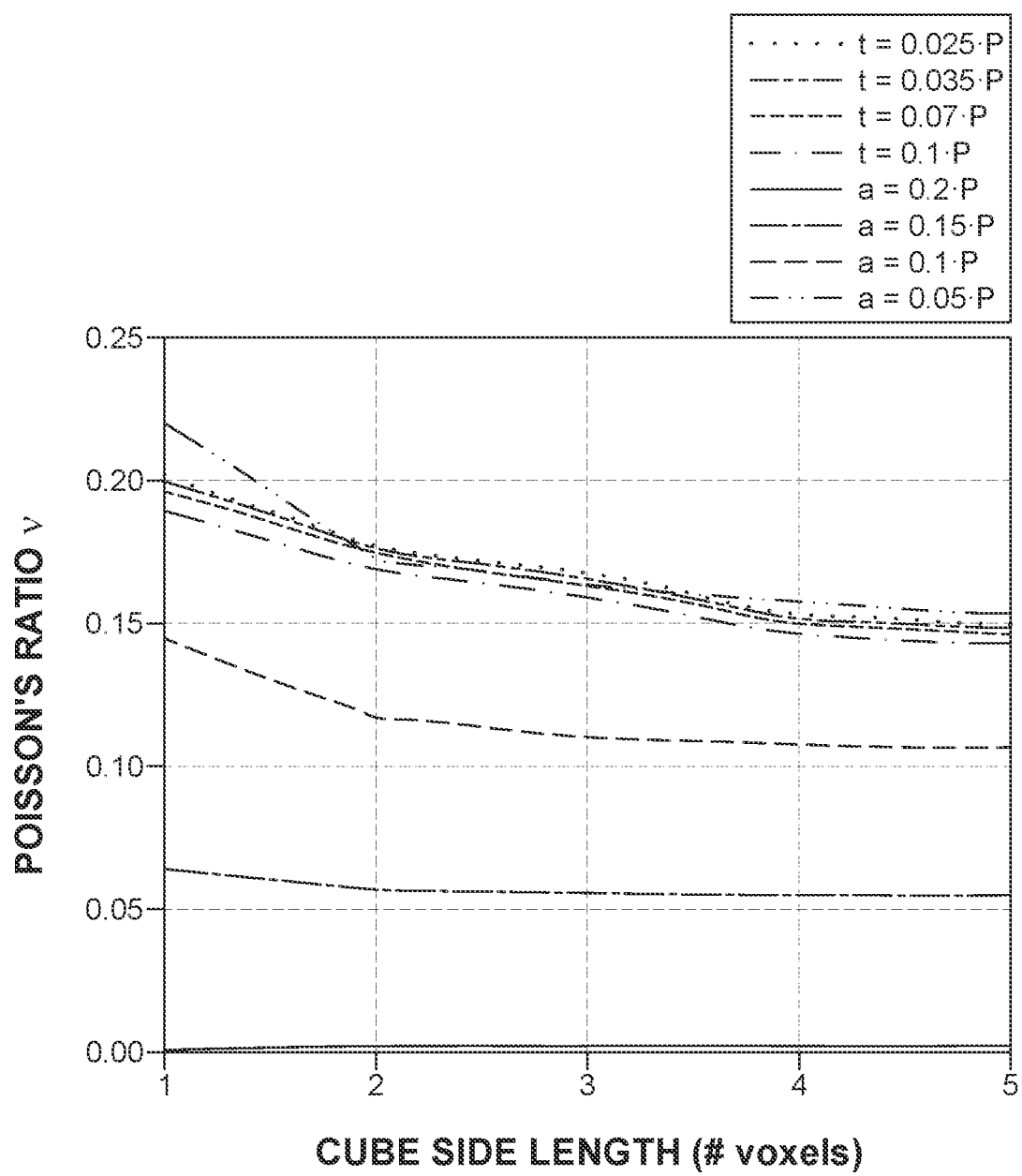
Figure 4E:
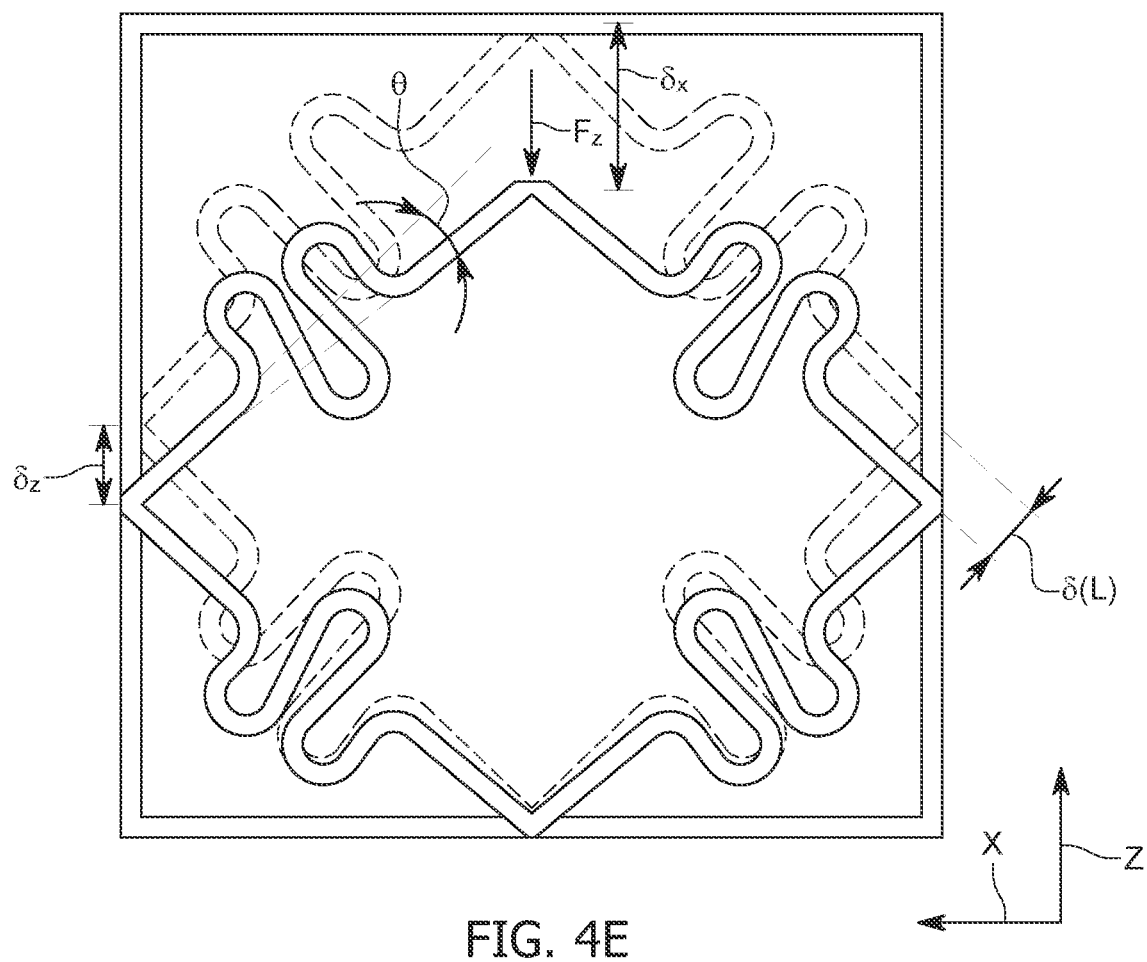

Another property observed experimentally, and confirmed numerically, is a low, near-zero, Poisson's ratio, as illustrated in FIG. 4D, illustrating the simulated effective Poisson's ratios for the compliant and rigid voxel. At the largest compliant amplitude, the designer sees a value of near zero. As the amplitude a of the compliant spring feature goes to zero, the Poisson's ratio converges to around 0.15, which is the effective value for the entire parameter range of the rigid lattice.

Last, this lattice shows near quadratic stiffness scaling, in contrast to the near linear scaling shown by the rigid lattice, while having the same base lattice topology and connectivity as the rigid version meaning it has bending-dominated behavior with a stretch-dominated lattice geometry. The range of spring amplitudes as a function of lattice pitch P shown in FIGS. 4C and 8B is a=0.05, 0.1, 0.15, and 0.2, and these have scaling values of b=1.72, 1.89, 1.93, and 1.95, respectively. This is attributable to the localized behavior of the spring-like beams. Whereas in the rigid lattice vertically oriented beams in compression are offset by horizontally oriented beams in tension, resulting in stretch-dominated behavior, here, global strain is a function of local spring-beam strain, which does not produce significant reactions at beam ends opposite an external load.

Auxetic Lattice Behavior

Figure 5A:
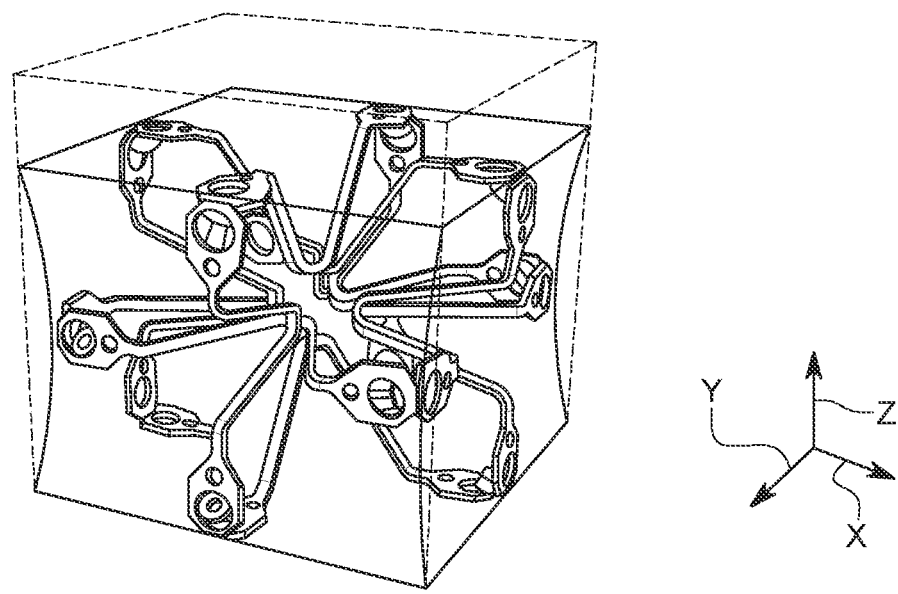
FIGS. 5A-5E show auxetic mechanical metamaterial of (A) unit cell voxel demonstrating reentrant mechanism action resulting in negative transverse strain in response to compressive load, (B) reduced order beam model simulation results recreating experiments, with out-of-plane reentrant behavior highlighted, (C) Effective Poisson's ratio simulation and experimental results, (D) 3D contour plot demonstrating effect of boundary conditions resulting in near-zero Poisson's ratio at edges, and (E) free body diagram of unit cell illustrating how an auxetic lattice type deforms through bending at the joints, and can be considered a pseudo rigid body model as shown to the side
Figure 5B:
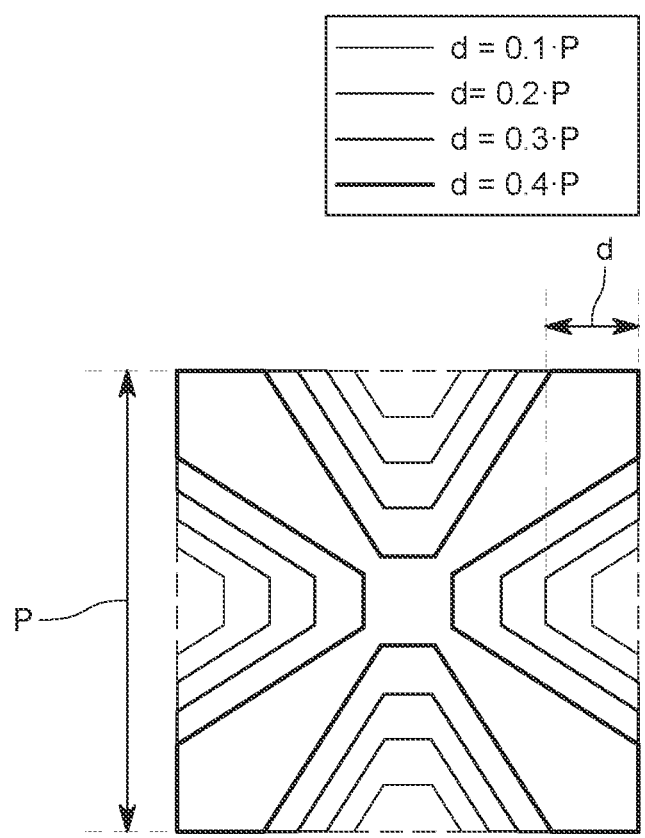
Figure 5C:
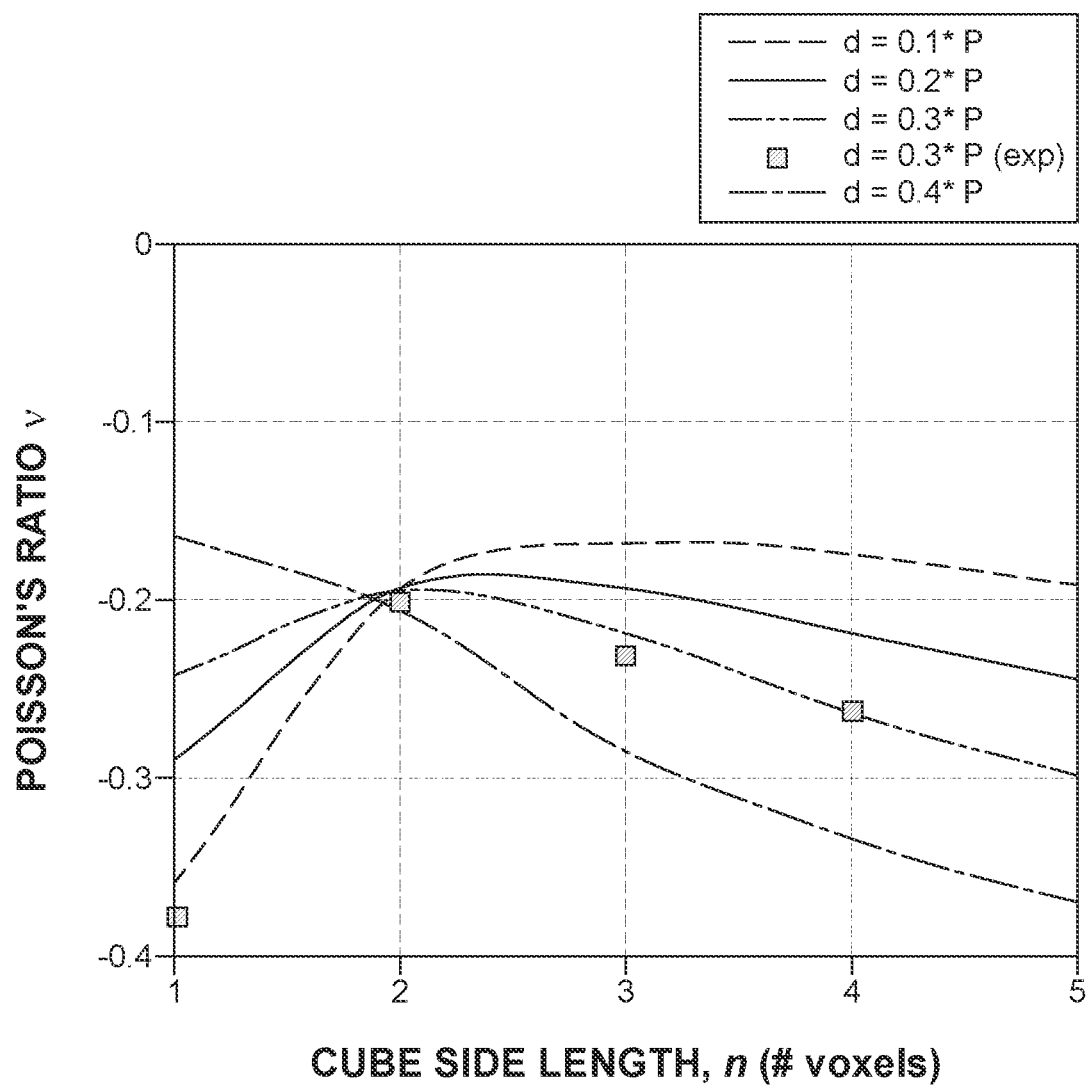

Referring the FIGS. 5A-5E, the auxetic lattice type exhibits a controllable negative Poisson's ratio, as present in the associated experimental and numerical results for the auxetic lattice type. The characteristic behavior of an auxetic unit cell voxel 64 is shown in FIG. 5A. Because of the internal architecture of the auxetic cell face 30 having interconnected (at a connection point 38), reentrant mechanisms 32, the cell responds to axial strain with a similarly signed transverse strain, resulting in a negative Poisson's ratio: $-\epsilon_{trans}/\epsilon_{axial}$. This value can be controlled based on the reentrant distance (d) (or auxetic parameter 34) as a function of lattice pitch P, as shown in FIG. 5C.

Figure 5D:
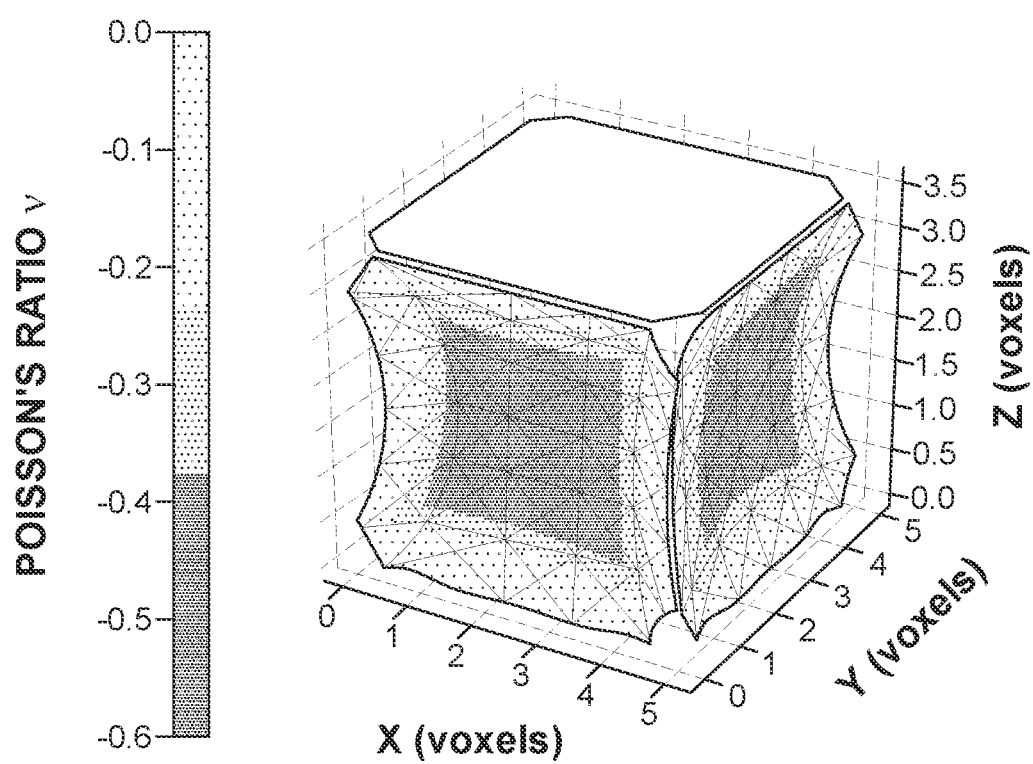
Figure 5E:
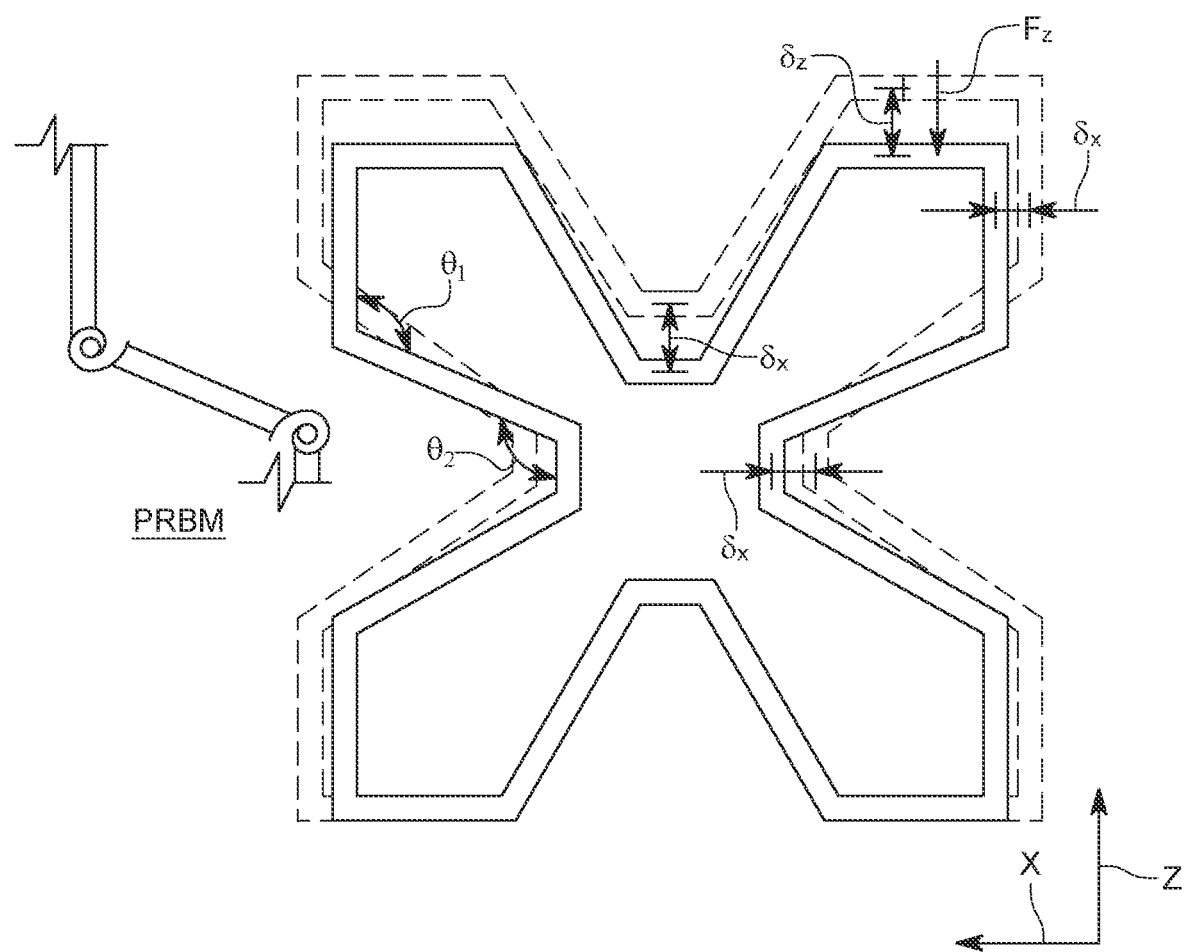

Additional experimental results are shown in FIG. 5C. Lattice specimens are cubes of voxel width n=1 to 4. Specimens were compressed to identical strain values ($\epsilon_{axial}$=0.2), and transverse strain was measured by visually tracking points using fiducials mounted to the nodes along transverse faces (yz plane) parallel to the camera. These points are slightly obscured due to reduced reentrant behavior at the edges of the lattice. FIG. 5D shows contour plot element translation in the y direction, which is out of plane and normal to the camera view. While this behavior is generally isotropic, it should be noted that the effect of the internal mechanisms is reduced at the corners/edges of the cube specimen, as shown in FIG. 5E. (When the median effective strain values are plotted over the range of auxetic parameters 34, the median was chosen to reduce the influence of the boundary conditions where Poisson's ratio≈0. The experimental Poisson's ratios, indicated as black squares, were measured using fiducial targets and motion tracking at the points.)

A first insight is that the effective metamaterial behavior approaches a nominal continuum value as cube side length of voxel count n increases. For any reentrant distance, this behavior can be attributed to the increase of internal mechanism architecture relative to boundary conditions. Boundary conditions increase as a function of surface area proportional to $n^2$, while internal mechanism architecture increases as a function of specimen volume proportional to $n^3$. For lower values of d, the single voxel demonstrates lower values for Poisson's ratio (increased auxetic behavior) compared to multivoxel specimens, but this is strongly influenced by boundary conditions and can be considered an outlier.

The second insight is that the effective Poisson's ratio decreases (becomes more negative) as reentrant distance d is increased, for voxel specimens larger than n=1. This can be understood by considering the continuous beams of the reentrant faces as a pseudo-rigid body model, where continuous flexural mechanisms are discretized as effectively rigid links connected by planar joints with torsional stiffness (i.e., a spring). As d decreases, so does link length, causing less clearly defined boundaries between the rigid link and compliant spring joint. As a result, the rigid link (at the nodes 36) behavior begins to dominate, causing higher overall effective stiffness and lower compliance, thus reducing the reentrant mechanism efficacy.

Chiral Lattice Behavior

Figure 6A:
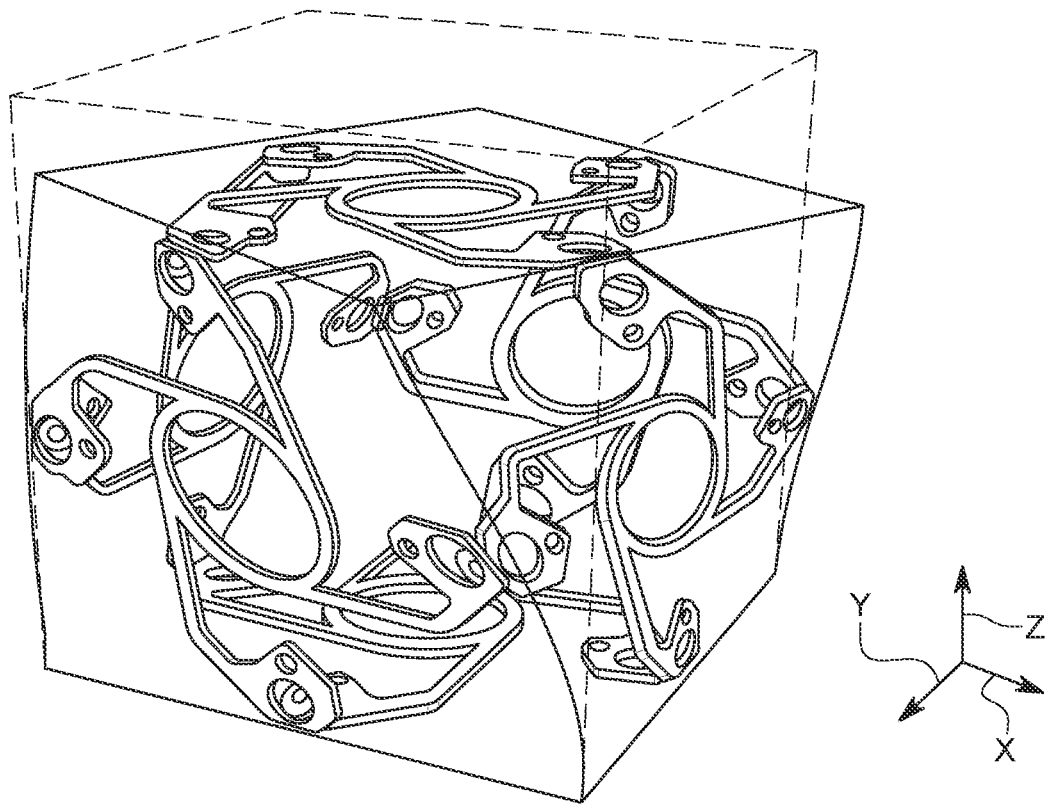
FIGS. 6A-6E show chiral mechanical metamaterial of (A) unit cell voxel demonstrating out-of-plane coordinated rotation in response to compressive load, (B) simulation and experimental results for odd and even column cross sections in combination with design rules 1 and 2 (R1 and R2), (C) two chiral part types allow internal frustration to be avoided, thus enabling scalable chiral architecture, (D) Design rules 1 (left) and 2 (right), which emerge from odd and even columns, respectively, and (E) free body diagram of unit cell illustrating how a chiral lattice type deforms by bending and rotation in side faces, and nearly pure rotation in top face, thus producing chiral response.
Figure 6B:
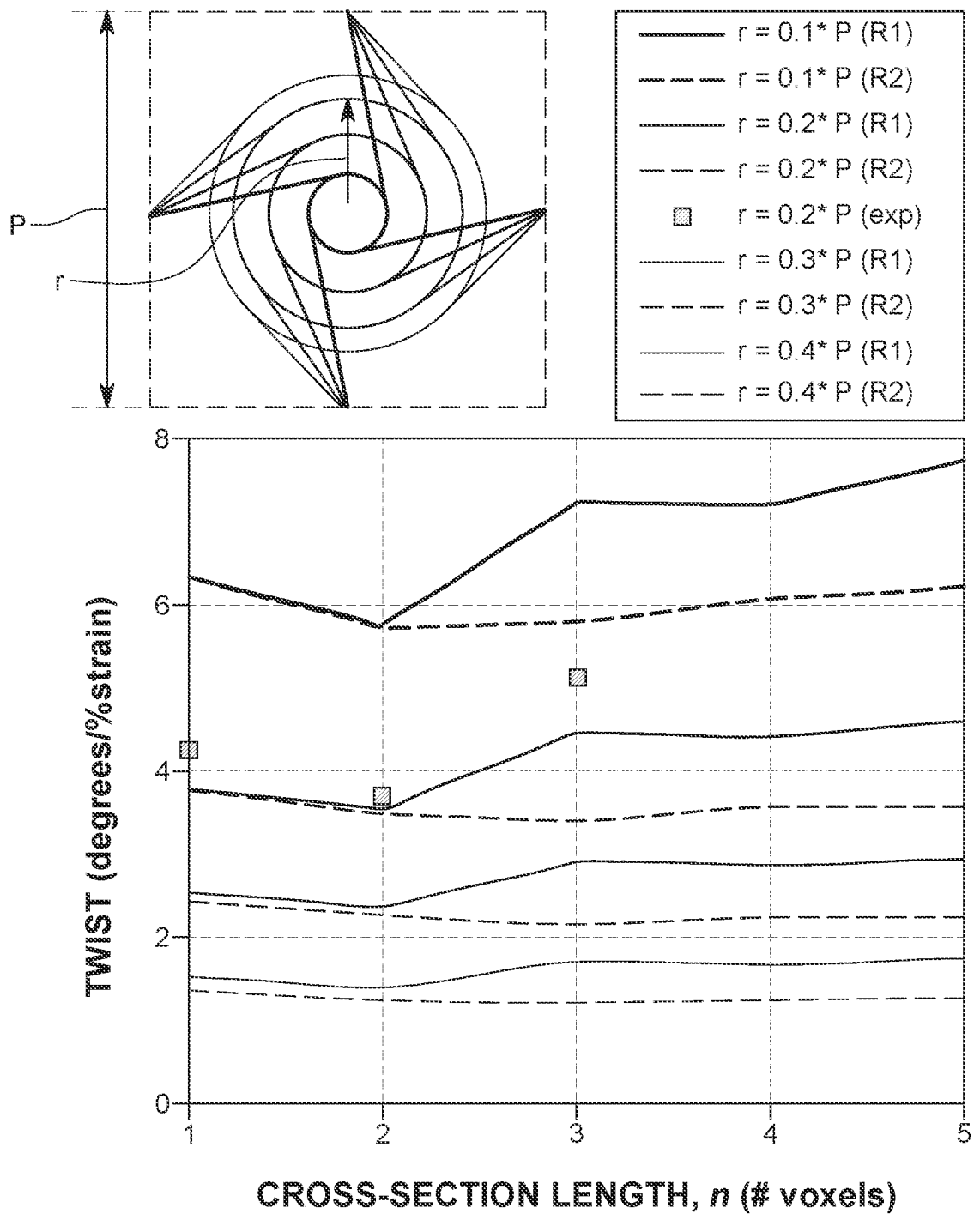
Figure 6C:
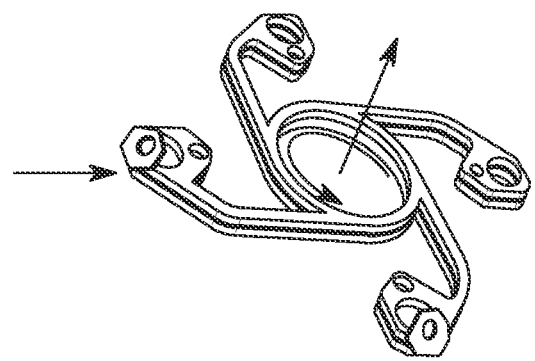
Figure 6C:
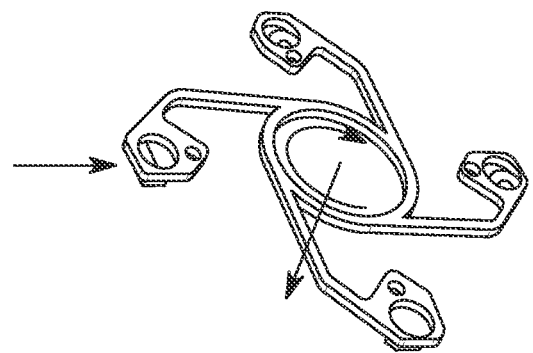
Figure 6C:
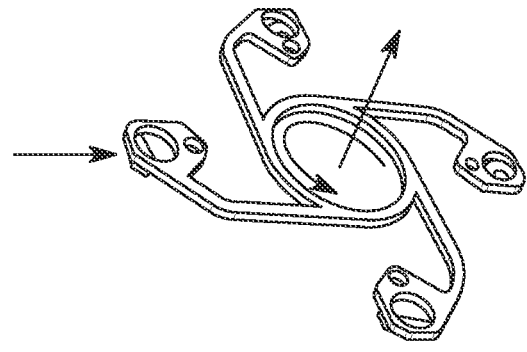
Figure 6D:
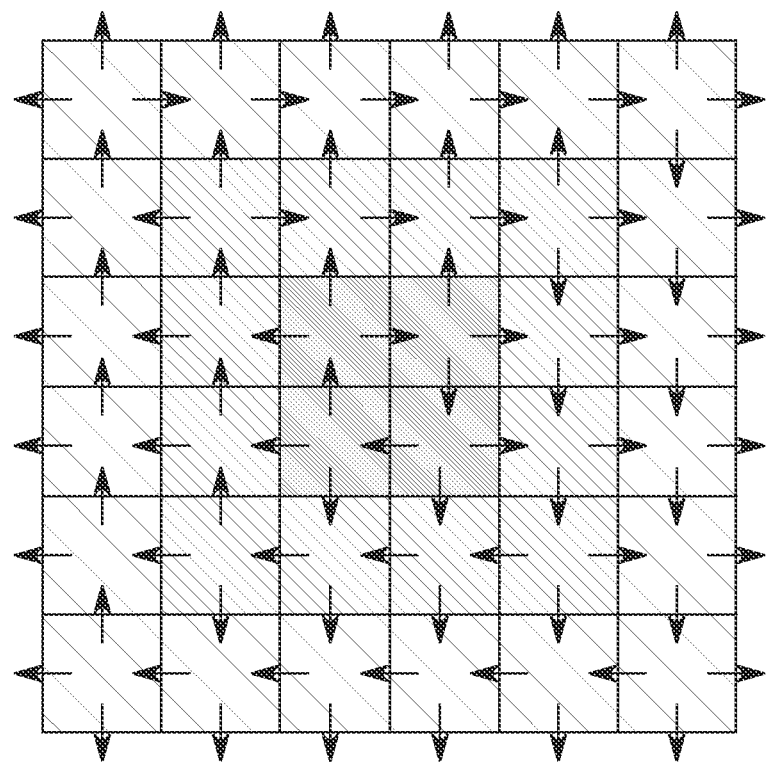
Figure 6D:
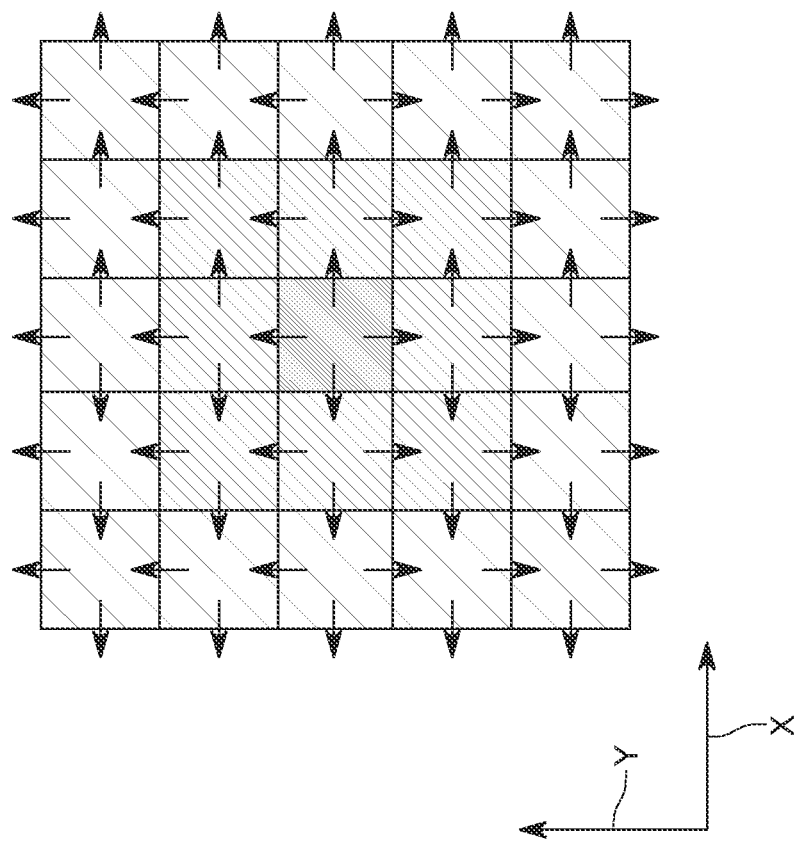
Figure 6E:
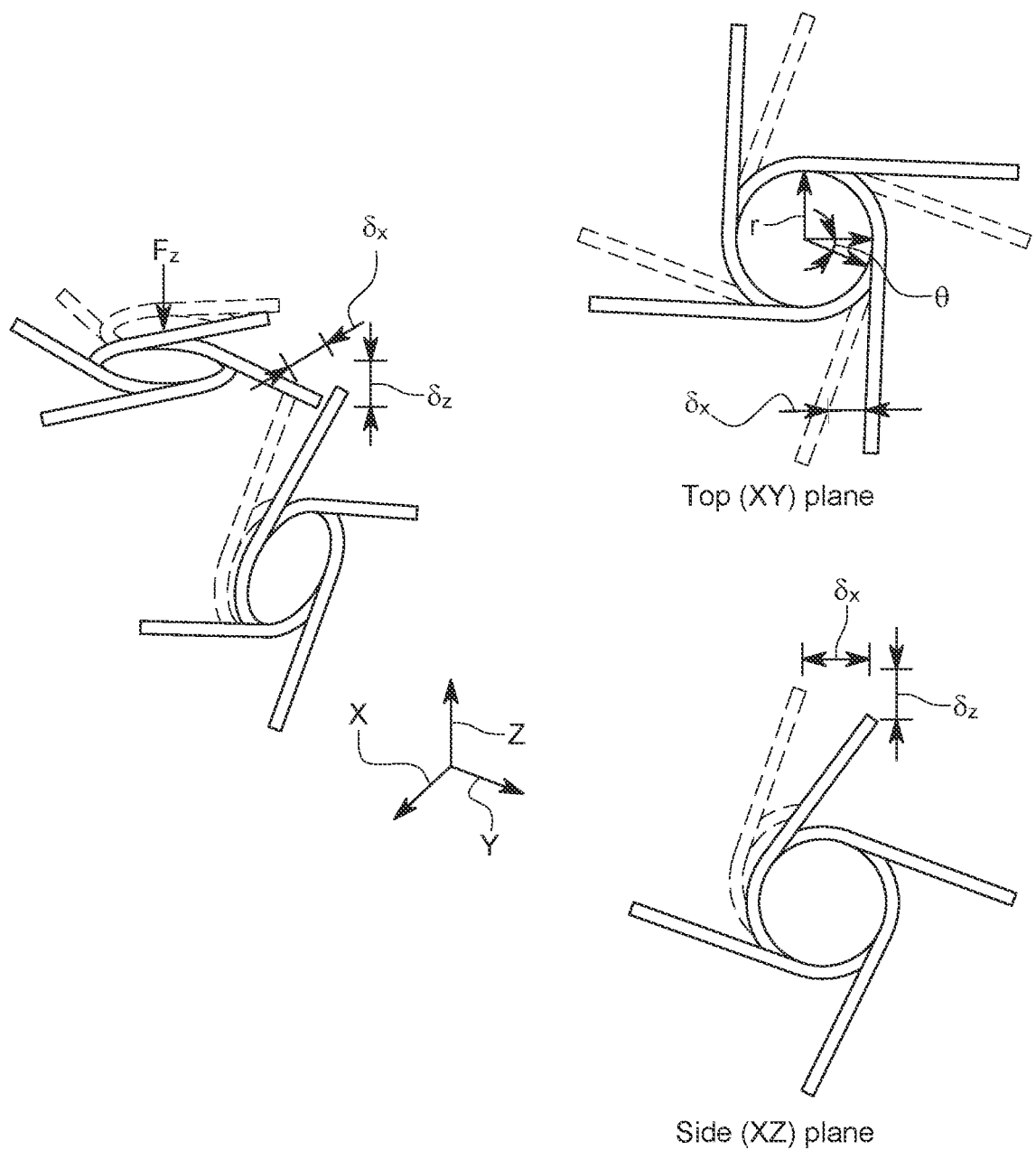
Figure 7B:
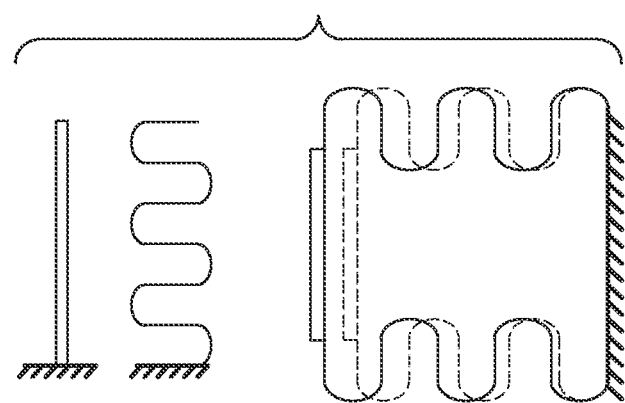
FIGS. 7A-7D show overview of metamaterial mechanisms of (A) Rigid, (B) Compliant, (C) Auxetic, and (D) Chiral.
Figure 7A:
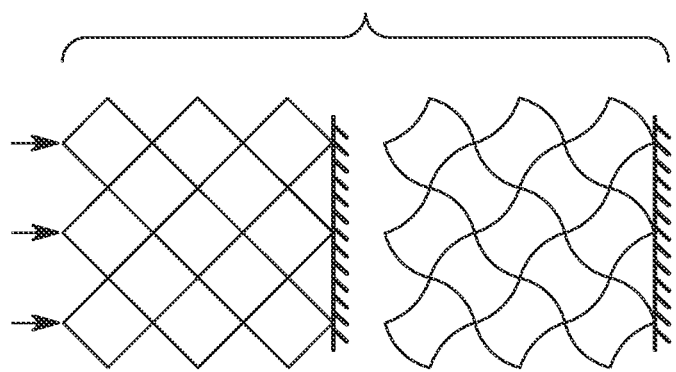
Figure 7D:
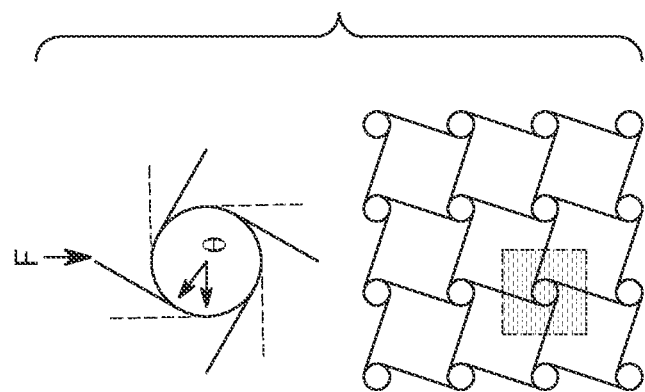
Figure 7C:
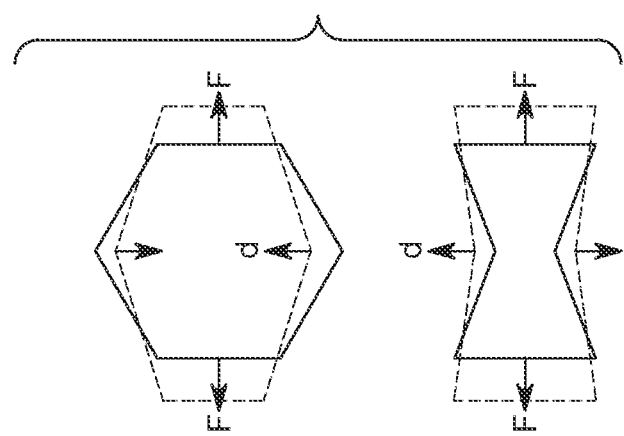

Referring the FIGS. 6A-6E. the chiral lattice type voxel 66 exhibits scalable twisting behavior, which is attributable to having two chiral part types and developing a construction logic to avoid internal frustrations. The characteristic behavior of a unit cell voxel is shown in FIG. 6A. Based on the chirality orientation, the cell will respond to an axial strain with a macroscopic twisting in either the CW or CCW direction, in the plane normal to the direction of loading (i.e., loading in z direction results in twisting in xy plane). The effective chirality can be measured as degrees twist per unit strain.

Each chiral part type cell face 40 has a beam 42 tangentially extending from each of four equally spaced apart points along an arcuate hub 46; wherein each beam 42 having a linear body portion 44 and a terminal node 48, wherein a center of the terminal node is in linear alignment with a center of the arcuate hub 46. The beam 42 has an inflection point 41 where a terminal portion 43 veers at an angle of incidence (ranging from twenty to forty-five degrees or more) relative to the linear body portion 44.

In certain lattices, the top half is CCW chiral lattice, and the bottom half is CW chiral lattice. This produces the largest net twist at the rigid interface between the two halves and allows fixed boundary conditions at the top and bottom. Chiral columns of 1×1×4, 2×2×8, and 3×3×12 were tested in compression to identical strain values ($\epsilon_{axial}$=0.05), and twist was measured by tracking a single point at the center of the lattice. The 1×1×4 column shows larger values for twist than does the 2×2×8 column. This is attributable to internal architecture, which is also the cause of the scalable twisting found over a range of beam sizes.

Values for twist per strain over a range of values for radius r of the face part as a function of lattice pitch P, have been shown that with an increase in column voxel width n, an increased twist per axial strain for smaller values of r is realized. This is attributable to the direct relationship between strain and twist as a function of the rotational mechanism. If it is assumed that a unit strain is translated into an arc length s, then the rotation angle increases as circle radius r goes to zero. However, given a nominal beam thickness t, there is a limit to how small r can become before the mechanism becomes ineffective.

In other words, performance does not decrease monotonically with increasing voxel count n but rather stabilizes to a continuum value. Also done properly, internal frustrations—when CW and CCW faces are joined, they essentially cancel each other's twist, resulting in zero twist per strain—can be avoided by using voids. Improved twist performance can be realized through designing the internal architecture according to rules chosen to avoid frustration. This means that voxel types are directionally anisotropic, in contrast to the previous three lattice types, and further are spatially programmed to produce desired global effective behavior.

A method for producing large-scale mechanical metamaterials through discrete assembly of modular, mass-produced set of part types, which exhibit a diverse range of behaviors, is disclosed herein. Furthermore, bulk, continuum behavior can be achieved through design of the parts and connections, ensuring that global behaviors are governed by local properties.

Rigid lattice types show linear stiffness-to-density scaling with predictable failure modes. Compliant lattice types show quadratic stiffness-to-density scaling, as well as unique bulk behavior at low cell count, such as near-zero Poisson's ratio. Auxetic lattice types show controllable, isotropic negative Poisson's ratio. Chiral lattice types show scalable transverse twist in response to axial strain, which is a result of two-part types being used to prevent internal architectural frustration. All four-part types showed good agreement with numerical results, and their behavior is predictable through analytical means. All lattice types are made the same way: parts are injection-molded and assembled to make voxels, and voxels are similarly joined to build lattices. This is a low-cost, highly repeatable process that promises to enable mechanical metamaterials at macroscales.

There are several advantages resulting from discrete assembly, which make it stand out from existing fabrication methods currently available for producing metamaterials, which include increased functionality, repairability, reconfigurability, and scalability. Because of the discrete nature of the construction, damaged or broken parts can be removed and replaced.

The machine cost and process challenges associated with making such a lattice structure with either of those methods highlight the benefits of this approach. Scaling will benefit greatly from assembly automation. Stationary systems promise high throughput for a bounded work envelope, while mobile robots can be parallelized and require no global positioning due to local alignment features, offering benefits of autonomy and reliability. Automation will be critical for producing these metamaterials and structures in large quantities envisioned for commercial applications.

Injection molding as used here offers low cost and high repeatability, but it immediately limits which constituent materials can be used. Sheets of material could be used with subtractive processes such as milling, laser, or water-jet cutting to make voxel face parts, although redesign of the joints would be needed. Natural materials such as wood can be used this way, and in the future, moldable bio-based resins with natural fibers are expected to be commercially available.

Heterogeneous metamaterials have been shown to offer exponential combinatorial possibilities. With low cost, the present invention envisions a metamaterial construction kit can still achieve spatial complexity using a heterogenous lattice using rigid and compliant parts, that demonstrates controllable anisotropy.

Referring to FIGS. 9A-9D, a discrete assembly system affords of number of different parts and resulting degree of spatial programmability; specifically, hybridization of discrete graded heterogeneous lattices, including one face part embodying two (2) part types, rigid and compliant, and adding gradual transitions between the two. The finer the step size, the more distinct part types there are. The face part themselves can also be heterogeneous, transitioning from rigid to compliant by adding compliant beams one at a time. This is anisotropic, but this could be leveraged to design specific deformation modes into a lattice, such as having compliant or rigid bands or stripes running throughout a given structure.

Producing large scale mechanical metamaterials through discrete assembly of modular, mass-produced parts is contemplated by the present invention. Furthermore, bulk, continuum behavior can be achieved through design of the parts and connections, ensuring global behaviors are governed by local properties.

By offering a simple yet diverse set of parts unified with a consistent assembly method, the disclosure represents a significant step in lowing the barrier for entry to realizing the promise of metamaterials. Combined with hierarchical design tools and assembly automation, the present invention enables emerging fields such as soft robotics, responsive aero and hydrodynamic structures, and user-defined programmable materials, thereby further merging the digital and physical sides of future engineering systems.

Hydrostructures

Soft robots offer adaptability and resilience for manipulation and control through a balance between compliance and stiffness, with continuous deformations in contrast to rigid mechanical systems. Despite these benefits, soft robots have faced inherent challenges associated with their use of soft materials, including limits on the loads that they can support, issues with their scalability, difficulties in integrating heterogeneous system properties, a requirement for production tooling, and the need to actively maintain static configurations.

The disclosure presents a novel method to construct cellular soft robots that can address these constraints by discretely assembling mechanical metamaterials. By combining two simple regular part types (rigid and compliant) high-performance anisotropic structures are enabled. Combining these with distributed actuation results in actively deformable robotic systems demonstrates a novel application as a continuously deformable cellular hydrodynamic soft robot based on bio-inspired swimming motions.

A hydrostructure construction system may include rigid and compliant discrete lattice materials/part types manufactured the same way-injection molding of GFRP. They may then be assembled into voxels, and then into a lattice. When assembled, these behave as continuum mechanical metamaterials with distinct properties (in this case, rigidity and compliance). Their application as stiff and soft areas on novel robotic platforms; for instance, quadrupeds need joints connecting relatively stiff limbs. Flying requires low effective density, while maintaining sufficient stiffness to withstand aerodynamic loading while generating lift. Adding compliance enables dynamic shape change. Swimmers perhaps most of all benefit from globally deformable structural systems, where the entire body of a fish or eel contributes to both propulsion and drag reduction.

The lattices disclosed in the heterogenous lattice structure may have the same lattice pitch p, are the same relative density, and are made from the same material, yet they have an order of magnitude difference between their effective moduli. In one embodiment, the rigid lattice has an effective elastic modulus $E^*$ of 8 MPa, an effective Poisson's ratio of 0.15, and an effective density of 30 kg/m$^3$, and the compliant lattice has an effective elastic modulus $E^*$ of 0.1 MPa, an effective Poisson's ratio of 0.1, and the same effective density. Using these two lattice materials together for controllable anisotropy through heterogeneous lattice design will enable large scale morphing structures to be built quickly. Because beams have the same geometry, specifically, length L, effective cross-sectional area A, and effective second moment of area I, their structural behaviors have a relationship governed by the effective moduli of their respective lattice types, as characterized by their axial and bending stiffnesses.

Turbine Blanes

Figure 11A:
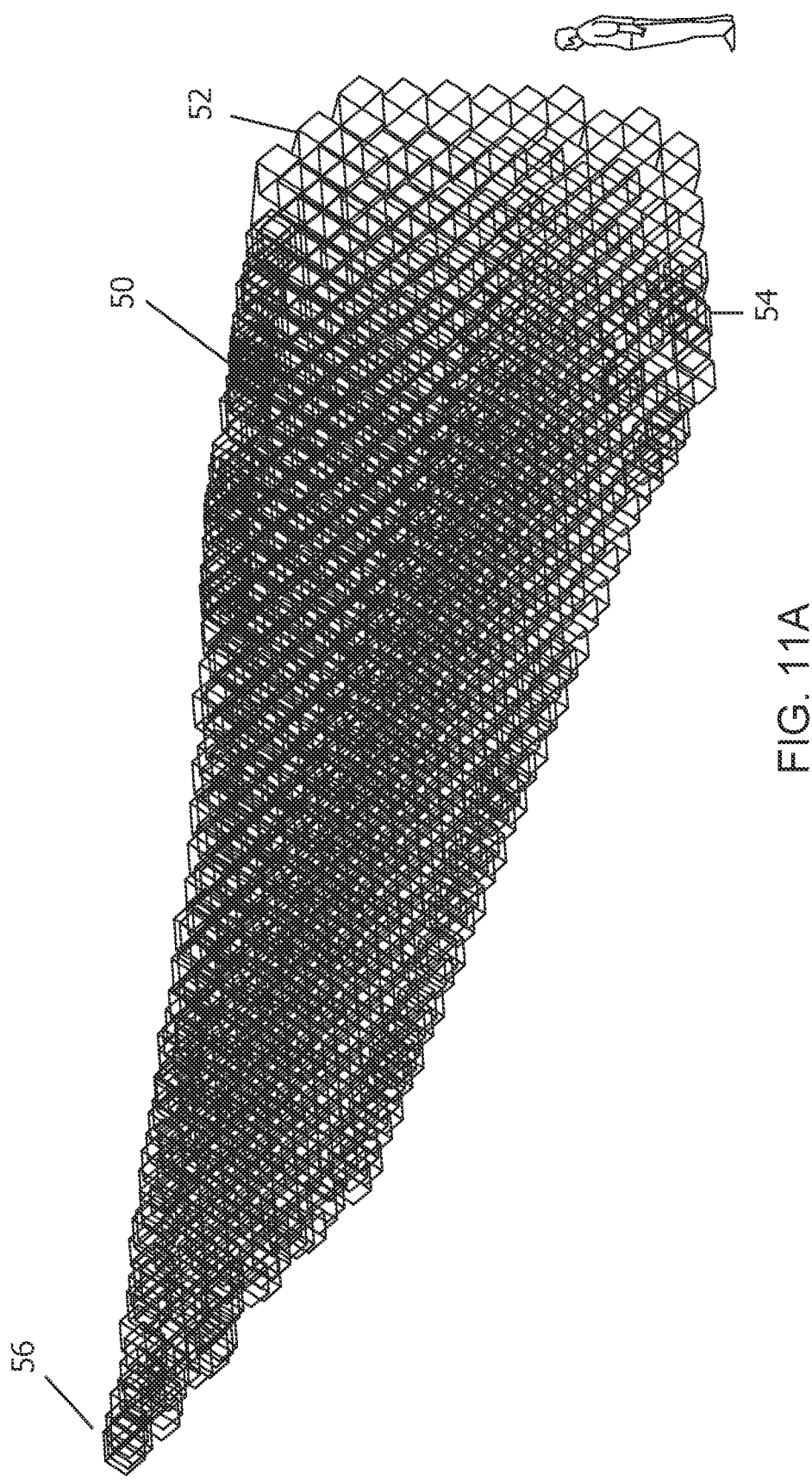
FIGS. 11A and 11B are perspective views of (A) a turbine blade comprising notional lattice material in comparison to a prior art turbine blade.
Figure 11B:
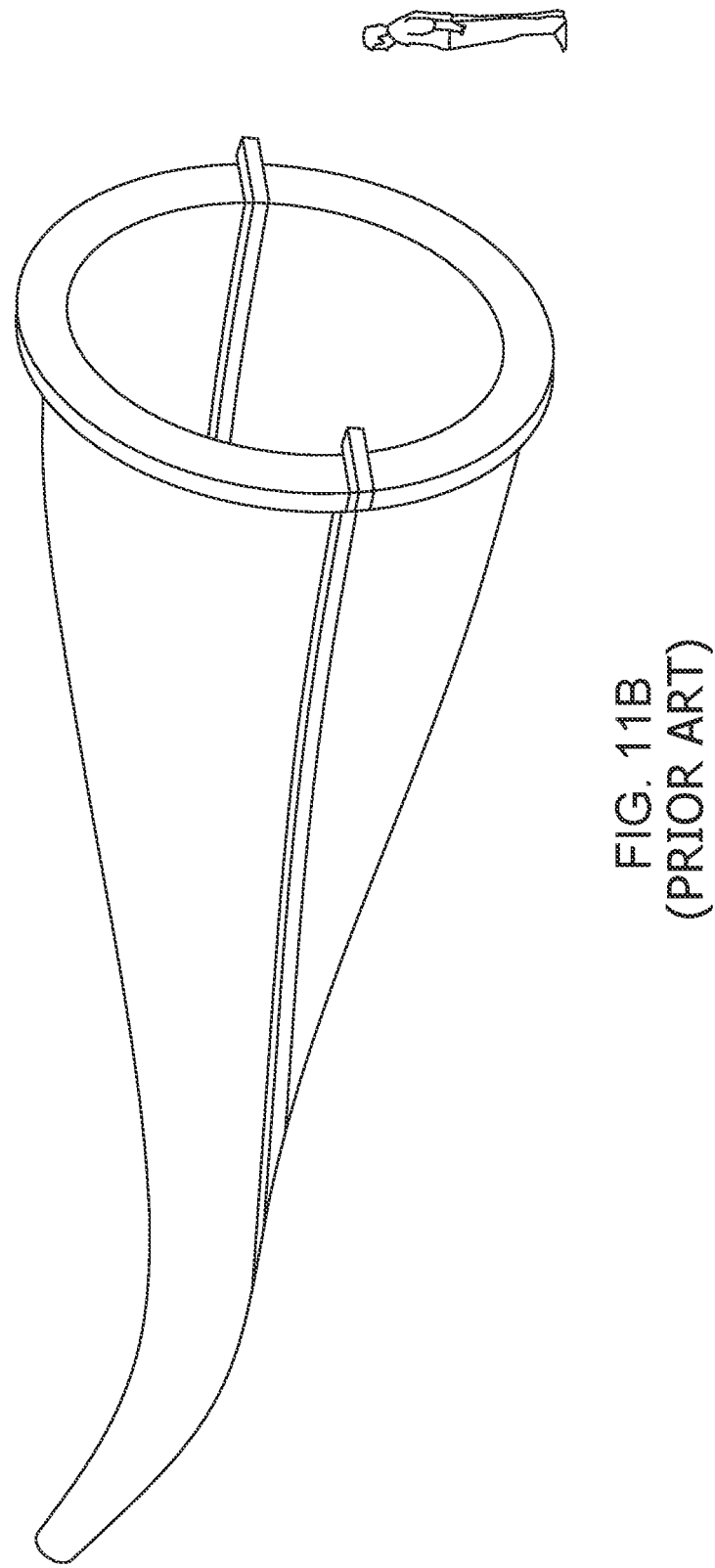
Figure 12:
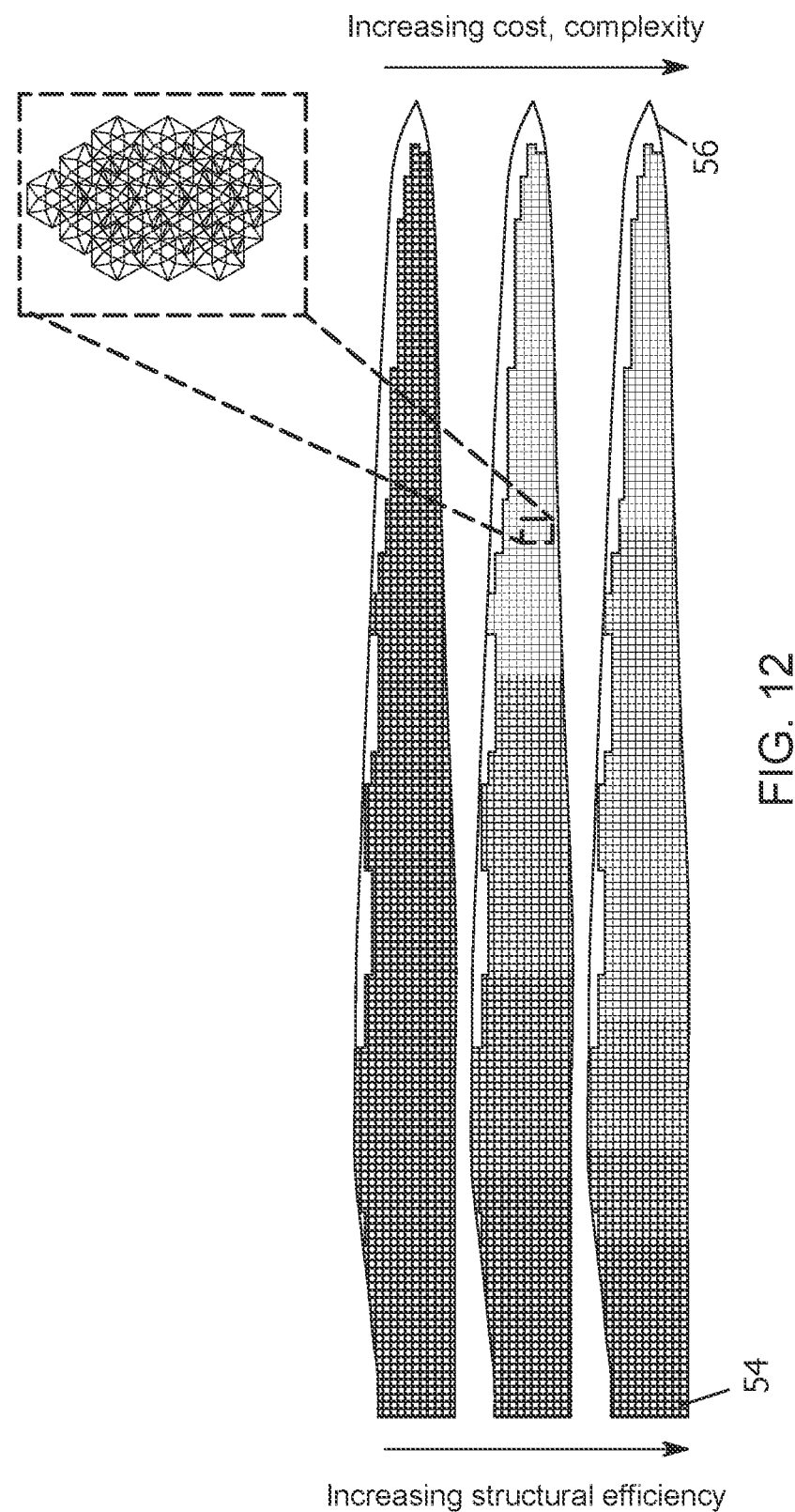
FIG. 12 is a diagrammatical view of discretely assembled turbine blades, illustrating heterogeneous and homogeneous gradients.

Referring the FIGS. 11A-12, wind turbine blades are among the largest single structural elements made—the current largest wind turbine blade is the LM 107 m blade on the GE Haliade-X 12MW turbine. Blades longer than 100 m have been thoroughly investigated, but not many exist. This is not due to design or manufacturing problems—the issues are mainly logistical. Over around 60 m, blade transport becomes problematic, in terms of getting blades from the production facility to the installation site. While solutions exist, they become expensive. On-site blade manufacturing bypasses this, but there are significant capital expenditures required, which is why there are so few examples. Nonetheless, given the potential of increasing rotor diameter, models for 100 m blades have been developed which can be used as reference for a lattice blade design.

By simply scaling up current blade designs, some important relationships emerge. Energy production scales as rotor diameter $D^2$, but blade mass and cost scale as $D^3$. Rotor cost per kilowatt capacity scales roughly linearly, but cost per energy capture scales sub-linearly. In total this means that larger rotors cost more to produce up front but produce more energy at lower cost while in operation. There have been several proposed concepts to achieve extreme-scale wind turbines, such as downwind, pre-aligned blades to prevent tower strikes under large out of plane deflection. Arguably this keeps forces in the axial direction, as opposed to pure root bending, and this approach can also benefit from segmented and morphing blades. Given the primarily structural requirements at the root and primarily aerodynamic requirements at the tip, it is conceivable that a lattice turbine blade 50 can accomplish both while also enabling tooling-free fabrication on-site, which can enable access to new, remote wind farm areas.

Morphing blade portions may be heterogeneous lattice geometries are combined to result in a structure that is stiff in bending but compliant in torsion, allowing tip twist actuation and global shape change for roll control with reduced drag.

As an example of calculating structural efficiency, reported bending stiffness EI ($N*m^2$), linear mass (kg/m), second moment of area I ($m^4$), and cross-sectional area A ($m^2$), to derive the blade's effective specific stiffness. Then, using the Ashby-Gibson scaling law, the designer can calculate matching effective specific stiffness for the lattice 52, $E^*/E=a(p^*/p)b$, where a and b are scaling values based on the lattice geometry. Using properties of a 50 percent long carbon fiber reinforced nylon LCF50 (E=40 GPa, a=500 MPa, p=1,370 kg/m³), a designer can estimate the resulting mass of a lattice blade with matching stiffness, which has been determined to be 22 percent less than the baseline model. Cost of material (recurring) and injection mold tooling (non-recurring) can be compared directly as well, where this unoptimized version is more expensive, with anticipated cost optimizations to be determined throughout the project, and shown notionally in FIG. 12, illustrating that while there is a mass reduction.

For turbine blades, the present invention contemplates initially matching the bending stiffness of state-of-the-art reference blade designs and showed that there was a potential mass reduction of over 203 using a discretely graded lattice with decreasing density from root/bass 54 to tip 56.

As used in this application, the term "about" or "approximately" refers to a range of values within plus or minus 10% of the specified number. And the term "substantially" refers to up to 90% or more of an entirety. The words "about," "approximately," or the like, when accompanying a numerical value, are to be construed as indicating a deviation as would be appreciated by one of ordinary skill in the art to operate satisfactorily for an intended purpose.

Recitation of ranges of values herein are not intended to be limiting, referring instead individually to any and all values falling within the range, unless otherwise indicated, and each separate value within such a range is incorporated into the specification as if it were individually recited herein. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

Several descriptions and illustrations have been presented to aid in understanding the present invention. One with skill in the art will realize that numerous changes and variations may be made without departing from the spirit of the invention. Each of these changes and variations is within the scope of the present invention.

What is claimed is:

1. A cuboctahedron cell voxel of a discrete macroscopic lattice structure, the cuboctahedron cell voxel comprising:
   at least one cell face comprising:
      four beams that form a substantially square shape, each beam having a beam portion with a thickness; and
      at least one beam having a spring-beam portion with a spring-beam geometric parameter comprising an amplitude greater than the thickness of the beam portion prior to external loading of the cuboctahedron cell voxel.

2. The cuboctahedron cell voxel of claim 1, wherein the beam portion resolves an external load substantially through axial bending, wherein the spring-beam portion resolves the external load substantially through axial deformation as a function of the spring-beam geometric parameter.

3. The cuboctahedron cell voxel of claim 2, wherein each spring-beam portion is a waveform.

4. The cuboctahedron cell voxel of claim 3, wherein the waveform defines a corrugated shape.

5. The cuboctahedron cell voxel of claim 3, wherein the at least one cell face is six cell faces.

6. The cuboctahedron cell voxel of claim 1, wherein the at least one beam is four beams.

* * * * *